(12) United States Patent
Andersen et al.

(10) Patent No.: US 11,105,526 B1
(45) Date of Patent: Aug. 31, 2021

(54) SAFETY SHUTDOWN SYSTEMS AND METHODS FOR LNG, CRUDE OIL REFINERIES, PETROCHEMICAL PLANTS, AND OTHER FACILITIES

(71) Applicant: INTEGRATED GLOBAL SERVICES, INC., Richmond, VA (US)

(72) Inventors: Bo Andersen, Conroe, TX (US); Karyn Y. Andersen, Conroe, TX (US)

(73) Assignee: INTEGRATED GLOBAL SERVICES, INC., Richmond, VA (US)

( * ) Notice: Subject to any disclaimer, the term of this patent is extended or adjusted under 35 U.S.C. 154(b) by 344 days.

(21) Appl. No.: 16/145,363

(22) Filed: Sep. 28, 2018

Related U.S. Application Data

(60) Provisional application No. 62/565,355, filed on Sep. 29, 2017.

(51) Int. Cl.
*F24F 11/32* (2018.01)
*F24F 11/58* (2018.01)
(Continued)

(52) U.S. Cl.
CPC .............. *F24F 11/32* (2018.01); *F24F 11/58* (2018.01); *F24F 11/65* (2018.01); *F24F 11/89* (2018.01);
(Continued)

(58) Field of Classification Search
CPC .. F24F 11/30; F24F 11/32; F24F 11/33; F24F 11/65; F24F 11/89; F24F 11/58
See application file for complete search history.

(56) References Cited

U.S. PATENT DOCUMENTS 3,855,277 A   12/1974 Fox
3,981,598 A    9/1976 Taulier
(Continued)

FOREIGN PATENT DOCUMENTS

DE   202005021038 U1   1/2007
DE   102011112528 A1   3/2013
(Continued)

OTHER PUBLICATIONS

Donaldson, "Downflo Oval Dust Collectors", Donaldson Company, Inc., Minneapolis, MN (USA), pp. 1-16 (2016).
(Continued)

*Primary Examiner* — Frantz F Jules
*Assistant Examiner* — Erik Mendoza-Wilkenfel
(74) *Attorney, Agent, or Firm* — Jeffrey L. Wendt; The Wendt Firm, P.C.

(57) ABSTRACT

Methods and systems for maintaining an atmosphere inside a habitat enclosing a work station and shutting down one, more than one, or all operational equipment inside and/or outside the habitat upon the occurrence of an adverse event. Concentrations of explosive, flammable, and/or poisonous gases or vapors are sensed, transmitted to a logic device, as are temperature, pressure, and/or humidity. HVAC units and air extraction units controlled by the logic device maintain acceptable pressure, temperature, and/or humidity. Any grit and dust may be extracted. Any explosive, flammable, and/or poisonous gases or vapors are extracted employing an emergency gas extraction sub-system controlled by the logic device. The logic device shuts down one, more than one, or all operational equipment inside and/or outside the habitat (for example as dictated by the client, law, or regulation) upon receiving one or more adverse event signals.

20 Claims, 8 Drawing Sheets

(51) Int. Cl.
    *F24F 11/65*      (2018.01)
    *F24F 11/89*      (2018.01)
    *F24F 140/10*      (2018.01)
    *F24F 110/66*      (2018.01)
    *F24F 110/65*      (2018.01)
    *F24F 110/64*      (2018.01)

(52) U.S. Cl.
    CPC ....... *F24F 2110/64* (2018.01); *F24F 2110/65* (2018.01); *F24F 2110/66* (2018.01); *F24F 2140/10* (2018.01); *F24F 2203/00* (2013.01)

(56) References Cited

U.S. PATENT DOCUMENTS

| | | |
|---|---|---|
| 4,076,587 A | 2/1978 | Taulier |
| 4,098,704 A | 7/1978 | Sandler |
| 4,294,944 A | 10/1981 | Newkirk et al. |
| 4,307,813 A | 12/1981 | Palmer |
| 4,312,966 A | 1/1982 | Newkirk et al. |
| 4,323,607 A | 4/1982 | Nishimura et al. |
| 4,397,977 A | 8/1983 | Sandler |
| 4,433,088 A | 2/1984 | Haaf et al. |
| 4,456,720 A | 6/1984 | Abolins et al. |
| 4,462,759 A | 7/1984 | Mcgeehee |
| 4,526,917 A | 7/1985 | Axelrod |
| 4,573,115 A | 2/1986 | Halgrimson |
| 4,637,473 A * | 1/1987 | Gillis .............. A62C 37/00 169/61 |
| 4,733,400 A | 3/1988 | Thyzel |
| 4,743,637 A | 5/1988 | Axelrod et al. |
| 4,802,502 A | 2/1989 | Williams |
| 5,263,824 A | 11/1993 | Waldbeser |
| 5,271,967 A * | 12/1993 | Kramer .............. C23C 4/12 29/888.061 |
| 5,287,817 A | 2/1994 | Lees, Jr. |
| 5,404,959 A | 4/1995 | Adkins, Sr. |
| 5,541,575 A | 7/1996 | Vimich |
| 5,552,121 A | 9/1996 | Buchanan |
| 5,722,256 A | 3/1998 | Shiflett |
| 5,828,307 A | 10/1998 | Washer |
| 6,053,632 A | 4/2000 | Leininger |
| 6,059,536 A | 5/2000 | Stingl |
| 6,186,167 B1 | 2/2001 | Grumstrup |
| 6,269,286 B1 | 7/2001 | Tse |
| 6,435,022 B1 | 8/2002 | Tareq |
| 6,647,301 B1 | 11/2003 | Sederlund |
| 6,774,806 B1 | 8/2004 | Bannell |
| 6,783,054 B1 * | 8/2004 | Pregeant, Jr. ......... B23K 9/321 219/130.01 |
| 6,975,247 B2 | 12/2005 | Kimmet |
| 6,992,569 B2 | 1/2006 | Nimberger |
| 7,030,746 B2 | 4/2006 | Littrell |
| 7,091,848 B2 | 8/2006 | Albarado |
| 7,130,537 B1 | 10/2006 | Maxham |
| 7,193,501 B1 | 3/2007 | Albarado et al. |
| 7,397,361 B2 | 7/2008 | Paulsen |
| 7,518,484 B2 | 4/2009 | Albarado et al. |
| 7,525,000 B2 | 4/2009 | Jordan |
| 7,556,238 B2 | 7/2009 | Seberger |
| 7,595,815 B2 | 9/2009 | Donovan |
| 7,692,537 B2 | 4/2010 | Skold |
| 7,869,889 B2 | 1/2011 | Flanders |
| 8,159,364 B2 | 4/2012 | Zeine |
| 8,330,605 B2 | 12/2012 | Johnson, Jr. |
| 8,379,439 B2 | 3/2013 | Walters |
| 8,397,439 B2 | 3/2013 | Watters |
| 8,400,317 B2 | 3/2013 | Johnson, Jr. |
| 8,410,953 B2 | 4/2013 | Zeine |
| 8,436,277 B2 | 5/2013 | Wardlaw |
| 8,667,743 B2 | 3/2014 | Watters |
| 8,678,711 B2 | 3/2014 | Wu |
| 8,704,630 B2 | 4/2014 | Melvin, Jr. |
| 8,859,884 B2 | 10/2014 | Dunton |
| 8,924,800 B2 | 12/2014 | Kao |
| 8,947,249 B1 | 2/2015 | Dore |
| 9,012,547 B2 | 4/2015 | Shope et al. |
| 9,080,111 B1 | 7/2015 | Huff |
| 9,219,760 B2 | 12/2015 | Flanders |
| 9,369,126 B1 | 6/2016 | Dunton |
| 9,371,001 B2 | 6/2016 | Fraser |
| 9,581,123 B2 | 2/2017 | Betscher |
| 9,705,934 B2 | 7/2017 | Flanders |
| 9,725,644 B2 | 8/2017 | Babcock |
| 10,518,301 B1 * | 12/2019 | Diebold .............. B23K 9/167 |
| 2002/0108436 A1 | 8/2002 | Albuaijan |
| 2003/0171092 A1 | 9/2003 | Karamanos |
| 2005/0073394 A1 | 4/2005 | Nimberger |
| 2005/0222476 A1 | 10/2005 | Jordan |
| 2006/0071771 A1 | 4/2006 | Paulsen |
| 2006/0156744 A1 | 7/2006 | Cusiter |
| 2006/0294579 A1 | 12/2006 | Khuti |
| 2007/0018127 A1 | 1/2007 | Seberger |
| 2007/0052543 A1 | 3/2007 | Albarado |
| 2007/0082601 A1 * | 4/2007 | Desrochers ......... F24F 3/0442 454/256 |
| 2007/0120695 A1 | 5/2007 | Albarado |
| 2009/0065489 A1 | 3/2009 | Duffy |
| 2009/0134995 A1 | 5/2009 | Wardlaw |
| 2009/0182185 A1 | 7/2009 | Jordan |
| 2009/0199973 A1 | 8/2009 | Watters |
| 2010/0004761 A1 | 1/2010 | Flanders |
| 2011/0088741 A1 | 4/2011 | Dunton |
| 2011/0204032 A1 | 8/2011 | Wardlaw |
| 2014/0136911 A1 | 5/2014 | Kao |
| 2014/0182160 A1 | 7/2014 | Squicciarini |
| 2014/0202296 A1 | 7/2014 | Forlong |
| 2014/0269744 A1 | 9/2014 | Flanders |
| 2015/0061409 A1 | 3/2015 | Dunton |
| 2015/0100218 A1 | 4/2015 | Fraser |
| 2015/0314152 A1 | 11/2015 | Moses |
| 2015/0379864 A1 | 12/2015 | Janchookiat |
| 2016/0036235 A1 | 2/2016 | Getsla |
| 2016/0040458 A1 * | 2/2016 | Walters ............ E05C 9/08 292/197 |
| 2016/0065622 A1 | 3/2016 | Flanders |
| 2016/0101842 A1 | 4/2016 | Hatfield |
| 2016/0122628 A1 | 5/2016 | Babcock |
| 2016/0126367 A1 | 5/2016 | Dunton |
| 2016/0177907 A1 | 6/2016 | Betscher |
| 2017/0067663 A1 | 3/2017 | Bama |
| 2017/0145918 A1 | 5/2017 | Oehring |
| 2017/0356597 A1 | 12/2017 | Nevison |
| 2020/0276789 A1 | 9/2020 | Oliveros |

FOREIGN PATENT DOCUMENTS

| | | |
|---|---|---|
| EP | 0026239 A1 | 4/1981 |
| EP | 1149451 A1 | 10/2001 |
| EP | 1161636 A1 | 12/2001 |
| EP | 1182809 A2 | 2/2002 |
| EP | 1183576 A2 | 3/2002 |
| EP | 1078379 B1 | 6/2002 |
| EP | 1161636 B1 | 8/2003 |
| EP | 1182809 A3 | 3/2004 |
| EP | 1407821 A2 | 4/2004 |
| EP | 1149451 B1 | 9/2004 |
| EP | 1407821 A3 | 9/2005 |
| EP | 1182809 B1 | 6/2007 |
| EP | 1407821 B1 | 11/2007 |
| EP | 1149451 B2 | 7/2008 |
| EP | 2759893 A1 | 7/2014 |
| EP | 3023814 A1 | 5/2016 |
| WO | 1996/001954 A1 | 1/1996 |
| WO | 1999/059175 A1 | 11/1999 |
| WO | 2000/042687 A1 | 7/2000 |
| WO | 2000/052374 A1 | 9/2000 |
| WO | 2000/065415 A2 | 11/2000 |
| WO | 2000/065415 A3 | 11/2001 |
| WO | 2003/093634 A1 | 11/2003 |
| WO | 2005/043030 A1 | 5/2005 |
| WO | 2005/043031 A1 | 5/2005 |
| WO | 2005/043034 A1 | 5/2005 |
| WO | 2005/045304 A1 | 5/2005 |

(56) References Cited

FOREIGN PATENT DOCUMENTS

| WO | 2005/045305 A1 | 5/2005 |
|---|---|---|
| WO | 2005/045308 A1 | 5/2005 |
| WO | 2005/097948 A2 | 10/2005 |
| WO | 2007/018876 A1 | 2/2007 |
| WO | 2010/002464 A1 | 1/2010 |
| WO | 2011/049930 A2 | 4/2011 |
| WO | 2011/049930 A3 | 4/2011 |
| WO | 2011/116766 A2 | 9/2011 |
| WO | 2012/129561 A1 | 9/2012 |
| WO | 2013/159034 A1 | 10/2013 |
| WO | 2014/048291 A1 | 4/2014 |
| WO | 2016/064645 A1 | 4/2016 |
| WO | 2016/079297 A1 | 5/2016 |
| WO | 2017/101031 A1 | 6/2017 |

OTHER PUBLICATIONS

Donaldson, "Downflo Oval with Ultra-Web Cartridge Filters Help Falmer Thermal Spray Get Greener and Grow", Donaldson Company, Inc., Minneapolis, MN (USA), pp. 1-3 (2018).
Eckhoff, "Dust Explosions in the Process Industries", Chapter 8, "Electrical Apparatuses for Areas Containing Combustible Dusts", pp. 549-579, Elsevier (2007).
ASM International, "Introduction to Thermal Spray Processing", pp. 3-15, (2004).
MTL Industries, "A Users Guide to Intrinsic Safety", pp. 1-20, (2017).
Isaac, "Automatic Control and Instrumentation for Hazardous Processes", pp. 13-19, Institute of Chemical Engineers (1960).
Matheson, "Lower and Upper Explosive Limits for Flammable Gases and Vapors (LEL/UEL)", p. 1 (2007).
Oneida, "20 hp Direct Drive Dust Collector Quote Sheet", pp. 1-7, Oneida Air Systems, Inc., (2016).
Pearson, J., "Emergency Shut Down Systems in Onshore and Offshore Process Operations", pp. 671-678, (2007).
Rhino, "Oil & Gas Enclosures", Rhino Shrink Wrap, pp. 1-9, (2017).
Rhino, "Oil & Gas Enclosures", Rhino, pp. 1-3, (2017).
Non-Final Office Action dated Sep. 17, 2020 in U.S. Appl. No. 16/145,332.
HOT-HED HABITAT™, downloaded from the Internet on Feb. 15, 2021 at url https://hot-hed.com/oilfield-services/pressurized-habitat.html.

* cited by examiner

300

312
Optionally extracting dust from the habitat employing one or more dust collection units fluidly connected to the habitat and controlled by the PLC

314
Extracting the explosive, flammable, and/or poisonous gases or vapors from inside the habitat employing an emergency gas jet extraction sub-system (EGES), an intake of the EGES fluidly connected to the habitat, the EGES controlled by the PLC, upon concentration of one or more of the explosive, flammable, one, more than one, or poisonous gases or vapors exceeding one or more maximum set point concentrations

316
Transmitting one or more signals from the PLC shutting down one, more than one, or all operational equipment inside and/or outside the habitat upon the PLC receiving one or more adverse event signals selected from the group consisting of i) a pressure rise in the sensed pressure above the maximum set point pressure inside the habitat, the maximum set point pressure being less than atmospheric pressure;
ii) a rise in concentration of one or more of the one or more sensed concentrations above the one or more maximum set point concentrations; and
iii) combination of i) and ii)

412
Extracting blasting grit and dusts from the habitat employing one or more dust collection units fluidly connected to the one or more air extraction units and controlled by the PLC

414
Extracting the explosive, flammable, or poisonous gases or vapors from inside the habitat employing an emergency gas jet extraction sub-system (EGES), an intake of the EGES fluidly connected to the habitat, the EGES controlled by the PLC, upon concentration of one or more of the explosive, flammable, and/or poisonous gases or vapors exceeding one or more maximum set point concentrations

416
Transmitting one or more signals from the PLC shutting down one, more than one, or all operational equipment inside and outside the habitat upon the PLC receiving one or more adverse event signals selected from the group consisting of i) a pressure rise in the sensed pressure above the maximum set point pressure inside the habitat, the maximum set point pressure being less than atmospheric pressure;
ii) a rise in concentration of one or more of the one or more sensed concentrations above the one or more maximum set point concentrations; and
iii) combination of i) and ii)

FIG. 4B

SAFETY SHUTDOWN SYSTEMS AND METHODS FOR LNG, CRUDE OIL REFINERIES, PETROCHEMICAL PLANTS, AND OTHER FACILITIES

CROSS-REFERENCE TO RELATED APPLICATIONS

This application is entitled to and claims the benefit of earlier filed provisional application No. 62/565,355, filed Sep. 29, 2017, under 35 U.S.C. § 119(e), which earlier filed provisional application is incorporated by reference herein in its entirety.

BACKGROUND INFORMATION

Technical Field

The present disclosure relates to systems and methods in the onshore and marine (offshore) processing fields. In particularly, the present disclosure relates to systems and methods useful for manually or automatically shutting down welding, blasting (for example, sand blasting or blasting using any grit), cutting, and any other automated work in liquefied natural gas (LNG) facilities, crude oil refineries, and petrochemical plants, or more generally in any facility where such work needs to be done safely, either while such facilities are in operation, or during facility shutdowns, turnarounds, and the like.

Background Art

Work may need to be performed in liquefied natural gas (LNG) facilities, crude oil refineries, and petrochemical plants in areas or environments where hydrocarbons or other explosive, flammable, or poisonous gases or vapors may be present. Three components are required for a fire or explosion: oxygen, fuel, heat. If the fuel is gaseous or vaporous, the lower explosive limit (LEL) and upper explosive limit (UEL) are key parameters, for if the gas or vapor is present in concentration between the LEL and UEL, if sufficient oxygen is present, all that is required is a spark, flame, or high heat to cause a fire or explosion. The LEL and UEL of gases and gas mixtures varies. Hydrogen has one of the largest ranges of concentrations between LEL and UEL, sometimes referred to as "explosive range" or flammable range, at 4.0 to 75.0. Methane has a range of 5.0 to 15; hydrogen sulfide has a range of from 4.0 to 44.0.

LNG facilities, crude oil refineries, and petrochemical plants of course may need maintenance either while shutdown or while in operation, the latter sometimes referred to as "on-line." In either case, work may need to be performed where there is a chance that an explosive, flammable, and/or poisonous gas or vapor could infiltrate the work site during the course of the work, and such environments are deemed "live environments" herein. The current means of performing this work is to construct a habitat or enclosure where workers can work, or simply do the work without any enclosure but wearing Personal Gas Monitors (PGM). Such habitats may employ shutdown systems for sensing when pressure inside the habitat drops below pressure exterior of the habitat. Such habitats and shutdown systems are designed for positive pressure (above atmospheric pressure) inside the habitat, and may automatically shutdown operations upon negative pressure being sensed inside the habitat.

As may be seen, current practice may not be adequate for all circumstances, and at worst may result in injury to workers. There remains a need for more safe, robust safety shutdown systems and methods allowing hot work to proceed during normal operation of facilities, particularly for facilities that may experience both positive and negative pressure in different work areas at the same time during normal operation, or only negative pressure. The systems and methods of the present disclosure are directed to these needs.

SUMMARY

In accordance with the present disclosure, safety shutdown systems and methods are described which reduce or overcome many of the faults of previously known systems and methods.

A first aspect of the disclosure is a method of maintaining an atmosphere inside a habitat enclosing a work station and shutting down one, more than one, or all operational equipment inside and/or outside the habitat (for example as dictated by the client, law, or regulation), in certain embodiments at least operational equipment inside and/or outside the habitat, upon the occurrence of an adverse event, the method comprising:

(a) sensing concentration of one or more explosive, flammable, and/or poisonous gases or vapors inside (alternatively, in certain embodiments outside, or in certain embodiments both inside and outside) the habitat;

(b) sensing pressure, temperature, and/or humidity inside (alternatively, in certain embodiments outside, or in certain embodiments both inside and outside) the habitat;

(c) transmitting (for example, by wired or wireless communication) the sensed concentrations, pressure, temperature, and humidity to a logic device (digital, analog or combination thereof, in certain embodiments a programmable logic controller (PLC));

(d) maintaining the pressure, temperature, and/or humidity inside the habitat (in certain embodiments within ranges defined by minimum and/or maximum set point pressures, temperatures, and humidities) by controlling one or more HVAC units and one or more air extraction units (AEUs) fluidly connected to the habitat and controlled by the logic device, the one or more AEUs extracting more air from the habitat than the one or more HVAC units supply to the habitat;

(e) optionally extracting dust from the habitat employing the one or more AEUs having one or more dust collection units fluidly connected to the one or more AEUs and controlled by the logic device;

(f) extracting the explosive, flammable, and/or poisonous gases or vapors from inside the habitat employing an emergency gas extraction sub-system (EGES) (in certain embodiments comprising one or more Venturi eductors or jets, and one or more gas compressors, in certain embodiments air compressors), an intake of the EGES fluidly connected to the habitat, the EGES (and/or actuators such as valves associated with the EGES) controlled by the logic device, upon concentration of one or more of the explosive, flammable, and/or poisonous gases or vapors exceeding one or more maximum set point concentrations; and (g) transmitting one or more signals from the logic device shutting down one, more than one, or all operational equipment inside and/or outside the habitat (for example as dictated by the client, law, or regulation) upon the logic device receiving one or more adverse event signals selected from the group consisting of i) a pressure rise in the sensed pressure above the maximum set point pressure inside the habitat, the maximum set point pressure being less than atmospheric pressure;

ii) a rise in concentration of one or more of the one or more sensed concentrations above the one or more maximum set point concentrations; and iii) combination of i) and ii).

In certain embodiments methods of this disclosure may comprise shutting down operational equipment outside the habitat upon the occurrence of the adverse event, in addition to that inside the habitat. As used herein, the term "operational equipment" means equipment defined by the operator or owner of the facility being worked on as being required to be shut down on the occurrence of an adverse event. "Adverse event" means the presence of explosive, flammable, and/or poisonous gas or vapor inside (alternatively, in certain embodiments outside, or in certain embodiments both inside and outside) and/or outside the habitat above a maximum set point concentration (which may be independently set for each gas or vapor), or the presence of pressure inside the habitat above a maximum set point pressure, where the set point pressure is below atmospheric pressure, or both of these conditions happening simultaneously or substantially simultaneously (within 30 seconds, or within 20 seconds, or within 10 seconds, or within 5 second, or within 2 seconds, or within 1 second, or less as further described herein). In certain embodiments, temperature (T) may be sensed inside the habitat(s) while pressure (P) and/or humidity (H) are sensed outside the habitat(s). Different habitats within a set of habitats may have different sensor strategies, for example, a sensor for one habitat sensing H inside the habitat, another sensing H outside a second habitat. All combinations of sensing T, P, and/or H inside and/or outside one or more habitats are disclosed herein and considered within the present disclosure. As used herein, "outside" a habitat means an area or region external of the habitat where it is likely or possible that one or more explosive, flammable, and/or poisonous gases may have a reasonable chance of entering the habitat during a job. For example, the outside region may reasonably extend 30 ft. (9 meters), or 40 ft. (12 m), or 50 ft. (15 m) away from the habitat, but an outside region extending 3,000 ft. (900 m) would not be reasonable.

In certain embodiments the method may operate in modes selected from the group consisting of automatic continuous mode, automatic periodic mode, and manual mode. In certain embodiments the one or more operational equipment may be selected from the group consisting of pneumatic, electric, fuel, hydraulic, and combinations thereof. In certain embodiments the one or more explosive, flammable, and/or poisonous gases and vapors may be selected from organic gases and vapors, combinations thereof (for example, an adduct), and mixtures thereof. In certain embodiments the one or more explosive dusts may be inorganic dusts. In certain embodiments the one or more inorganic explosive dusts may be one or more thermal spray metal dusts. In certain embodiments the one or more thermal spray metal dusts may be selected from the group consisting of thermal spray aluminum dust, thermal spray zinc dust, thermal spray copper dust, thermal spray stainless steel dust, thermal spray metal alloy dust, and combinations and mixtures thereof.

In certain embodiments the sensing concentration of the one or more explosive, flammable, and/or poisonous gases or vapors inside and/or outside of the habitat may comprise sensing concentration of explosive, flammable, and/or poisonous gases and vapors selected from the group consisting of natural gas, methane, ethane, ethylene oxide, hydrogen sulfide, oxygen, nitrogen, argon, hydrogen, carbon dioxide, carbon monoxide, propane, butane, pentane, and combinations and mixtures thereof. In certain embodiments the method may comprise sensing concentration of the one or more explosive, flammable, and/or poisonous gases or vapors outside the habitat in addition to inside. In certain embodiments the method may comprise sensing concentration of the one or more explosive, flammable, and/or poisonous gases or vapors at an air intake to the habitat. In certain embodiments the method may comprise wherein the sensing of concentration of the one or more explosive, flammable, and/or poisonous gases or vapors inside the habitat occurs at designated locations inside the habitat, for example, but not limited to the air entrance from an HVAC unit, above a door, near a bottom of a door, adjacent a window.

In certain embodiments the method may comprise operating and/or viewing the logic device from a human/machine interface wired or wirelessly connected to the logic device. In certain embodiments the method may comprise the logic device initiating one or more audio/visual warnings upon the occurrence of the pressure rise in the sensed pressure above the set point pressure, or the rise in concentration of one or more of the one or more sensed concentrations above one or more set point concentrations.

In certain embodiments the method may comprise opening one or more one-way back flash valves in ducts fluidly connecting the EGES with the habitat.

In certain embodiments the method may comprise maintaining an atmosphere inside the habitat, the habitat enclosing a work station for an on-line process, and shutting down operational equipment inside and outside the habitat upon the occurrence of an adverse event.

A second aspect of the disclosure is a system configured to maintain an atmosphere inside a habitat enclosing a work station and shut down one, more than one, or all operational equipment inside and/or outside the habitat (for example as dictated by the client, law, or regulation), in certain embodiments at least operational equipment inside and/or outside the habitat, upon the occurrence of an adverse event, the system comprising:

(a) one or more explosive, flammable, and/or poisonous gas or vapor sensors for sensing concentration of one or more explosive, flammable, and/or poisonous gases or vapors inside (alternatively, in certain embodiments outside, or in certain embodiments both inside and outside) and/or outside the habitat;

(b) one or more pressure sensors, one or more temperature sensors, and/or one or more humidity sensors inside (alternatively, in certain embodiments outside, or in certain embodiments both inside and outside) the habitat;

(c) one or more logic devices (as in the first aspect) in communication with the one or more explosive, flammable, and/or poisonous gas or vapor sensors, the one or more temperature sensors, the one or more pressure sensors, and/or the one or more humidity sensors;

(d); one or more HVAC units fluidly connected to the habitat and in communication with the one or more logic devices;

(e) one or more air extraction units (AEUs) fluidly connected to the habitat and in communication with the one or more logic devices;

(f) optionally the one or more AEUs having one or more dust collection units (DCUs) fluidly connected to the one or more AEUs and in communication with the one or more logic devices;

(g) an emergency gas extraction sub-system (EGES) (in certain embodiments comprising one or more Venturi eductors or jets, and one or more gas compressors (in certain embodiments air compressors) having an intake fluidly connected to the habitat, the EGES (and/or one or more actuators associated therewith) in communication with the one or more logic devices;

(h) the one or more logic devices configured to:
i) maintain the pressure, temperature, and/or humidity inside the habitat (in certain embodiments within ranges defined by minimum and/or maximum set point pressures, temperatures, and humidities) by controlling the one or more HVAC units and the one or more AEUs, the one or more AEUs configured to extract more air from the habitat than the one or more HVAC units supply to the habitat;
ii) optionally remove dust to an acceptable level (at least 90 percent, or at least 91, 92, 93 94 95, 96, 97, 98, 99, or 99.5 percent) from the habitat by operating the optional DCUs;
iii) transmit one or more signals to shut down one, more than one, or all operational equipment inside and/or outside the habitat (for example as dictated by the client, law, or regulation) upon receiving one or more signals selected from the group consisting of:
a) a pressure rise in the sensed pressure above the maximum set point pressure, the maximum set point pressure being less than atmospheric pressure;
b) a rise in concentration of one or more of the one or more sensed concentrations of explosive, flammable, and/or poisonous gases or vapors above one or more maximum set point concentrations; and
c) combination of a) and b); and
iv) transmit one or more signals to initiate operation of the EGES (and/or one or more actuators associated therewith) upon receiving one or more signals indicating concentration of one or more of the explosive, flammable, and/or poisonous gases or vapors exceeds one or more maximum set point concentrations inside the habitat.

As used herein "habitat" means a structure enclosing an atmosphere inside of which potentially hazardous work may be performed, either while equipment being worked on (for example, but not limited to pipes, vessels, towers, tanks, reactors, meters, heat exchangers, pumps, compressors) is operating or during equipment downtime. In certain embodiments the structure may be comprised of rigid materials, such as wood, metal, or other structural building material, for example, but not limited to silicone coated fiberglass. Certain exemplary embodiments include those wherein the structure may be comprised of a flexible material, for example a shrink-wrap plastic (polymeric) material. As used herein the term "shrink-wrap" includes, but is not limited to materials that may be heat shrinkable, pressure shrinkable, vacuum shrinkable, chemical shrinkable, or any combination thereof.

These and other features of the methods and systems of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain sensors may trigger audible alarms but not visual alarms, and vice versa. As another example, certain shrink-wrap materials may include one type of chemical additive, but devoid of other additives.

BRIEF DESCRIPTION OF THE DRAWINGS

The manner in which the objectives of this disclosure and other desirable characteristics can be obtained is explained in the following description and attached drawings in which:

FIGS. 3A and 3B together present a schematic logic diagram of one method of maintaining an atmosphere inside a habitat enclosing a work station and shutting down at least operational equipment inside the habitat upon the occurrence of an adverse event in accordance with the present disclosure;

FIGS. 4A and 4B together present a schematic logic diagram of another method of maintaining an atmosphere inside a habitat enclosing a work station and shutting down at least operational equipment inside the habitat upon the occurrence of an adverse event in accordance with the present disclosure;

It is to be noted, however, that the appended drawings of FIGS. 1, 2, 5, and 6, may not be to scale, and illustrate only typical embodiments of this disclosure. Furthermore, FIGS. 3A, 3B, 4A, and 4B illustrate only two of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

Figure 1:
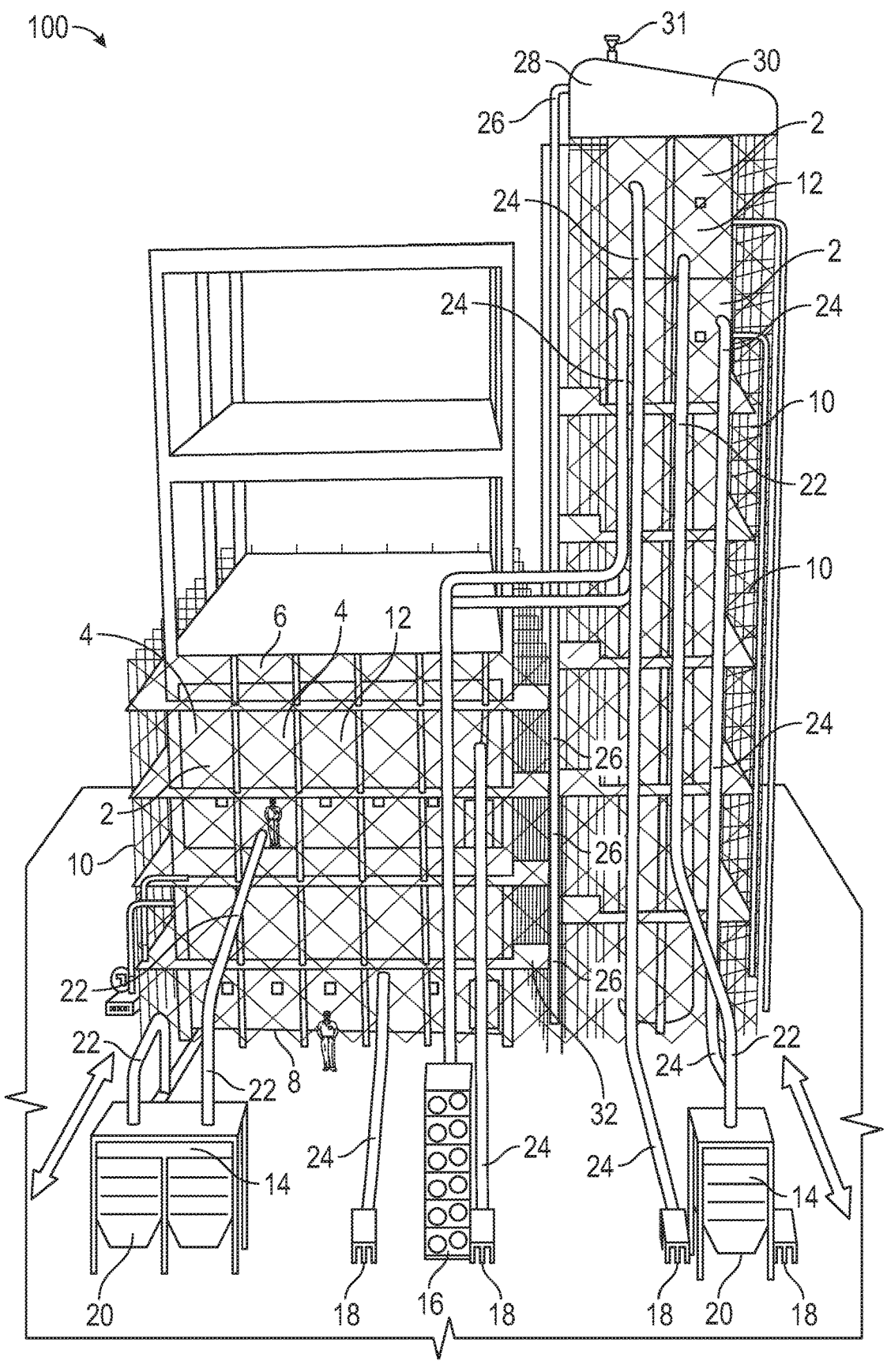
FIG. 1 is a schematic perspective view of a facility employing one system and method embodiment of the present disclosure for maintaining an atmosphere inside a habitat enclosing a work station and shutting down at least operational equipment inside the habitat upon the occurrence of an adverse event.

In the following description, numerous details are set forth to provide an understanding of the disclosed apparatus, combinations, and methods. However, it will be understood by those skilled in the art that the apparatus, systems, and methods disclosed herein may be practiced without these details and that numerous variations or modifications from the described embodiments may be possible. All U.S. published and non-published patent applications, U.S. patents, U.S. statutes and regulations, and standards referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein. All percentages are by weight unless specified otherwise.

As mentioned herein, LNG facilities, crude oil refineries, petrochemical plants, and other facilities of course may need maintenance either while shutdown or while in operation, the latter sometimes referred to as "on-line." In either case, work may need to be performed where there is a reasonable chance that an explosive, flammable, and/or poisonous gas or vapor could infiltrate the work site during the course of the work, and such environments are deemed "live environments" herein. The current means of performing this work is to construct a habitat or enclosure where workers can work, or simply do the work without any enclosure but wearing Personal Gas Monitors (PGM). Such habitats may employ shutdown systems for sensing when pressure inside the habitat drops below pressure exterior of the habitat. Such habitats and shutdown systems are designed for positive pressure (above atmospheric pressure) inside the habitat, and may automatically shutdown operations upon negative pressure being sensed inside the habitat.

Safety shut down (SSD) systems and methods are described which reduce or overcome many of the faults of previously known systems and methods. In certain embodiments the logic device and human/machine interface (HMI) of the SSD system may be located at the LNG, refinery, crude oil or petrochemical site and placed either inside or outside the habitat, or both.

The habitat or enclosure of choice is positioned over and around the piece of equipment to be welded, blasted, painted, hot-tapped, insulated, corrosion protected with thermal-sprayed aluminum (TSA) or other thermal spray metal (TSM), or otherwise. The inflow and outflow hoses, conduits, ducts, or chutes are connected to the habitat. Airflow into and out of the habitat is started, as will now be explained more fully with references to the drawing figures.

FIG. 1 is a schematic perspective view of a crude oil refining facility employing one system and method embodiment 100 of the present disclosure for maintaining an atmosphere inside a habitat enclosing one or more work stations 12 and shutting down one, more than one, or all operational equipment inside and/or outside the habitat (for example as dictated by the client, law, or regulation), in certain embodiments at least operational equipment inside the habitat, and in certain embodiments inside and/or outside the habitat, upon the occurrence of an adverse event. Some components that are obscured from view are illustrated with dotted lines or phantom lines. The system illustrated schematically in FIG. 1 includes several habitats or enclosures 2, each constructed of several habitat panels 4 or other structural building materials. Each habitat 2 has a roof or ceiling 6, a floor 8, and sidewalls connecting the floor and roof made of a suitably strong material, such as wood or metal, optionally including flame retardant additives. In certain preferred embodiments, the habitat may be constructed of flexible material such as flame retardant shrink wrap plastic such as high and low density polyethylene, and polypropylene (as described in our U.S. application Ser. No. 16/145,332, filed on the same date as the present application.) Other habitat embodiments may comprise composite materials such as fiber-reinforced polymers (FRP), where the fibers may be glass, carbon, aramid, and/or basalt. In certain embodiments the habitat panels may be attached together using hook and loop fasteners. Scaffolding 10 is illustrated, but is not a part of the present systems and methods except for allowing workers access for installing various components.

One or more air extraction units (AEUs) 20, optionally including dust collection units (DCUs) 14, are provided in embodiment 100. In general, as stated elsewhere herein, the primary function of the AEU is to extract more air from the habitat than is provided to the habitat by the HVAC unit(s) to control pressure (P) inside the habitats. A secondary function or benefit is the achievement or promotion of air clarity (for better visibility), and therefore safer conditions inside the habitats.

Any known type of AEU and optional DCU may be employed in practicing the systems and methods of the present disclosure. AEUs may be centrifugal, axial, positive displacement, or combination thereof, arranged in series or parallel. Suitable AEUs may be those available from Cincinnati Fan, Mason, Ohio, U.S.A. under the trade designation MODEL PB Series centrifugal fans, having air capacities up to 4500 CFM, and constructed from type 319 cast aluminum, which is non-sparking, belt drive or direct drive. Other suitable centrifugal fans include MODEL SPB (stamped steel construction); MODEL PBS (fabricated steel); MODELS LM and LMF (forward curve, cast aluminum), and MODEL HP-I pressure blowers. Axial flow air movers use a propeller to draw the air into the fan and discharge it in the same axial direction. Suitable tube axial fans may include those known under the trade designation TAF, BAF, WAF, which designate different bearing features, and are available with cast aluminum or steel props and either belt drive or direct drive, having a capacity ranging from 1500 to 50,000 CFM. Motors used in the fans may be "Totally Enclosed Fan Cooled" (TEFC) or "Totally Enclosed Non-Vented" (TENV) motors, or Explosion Proof (EXP) motors.

Optional DCUs may be selected from bags or bag houses, vertical cartridge filters, and horizontal cartridge filters, whether upflow, downflow, or crossflow, with any cartridge shape (for example, but not limited to circular, oval, polygonal, rectangular, and triangular). The type, size, and size distribution of particulates (dusts) being collected, and the expected flow rates of air in which the dusts are flowing, influences the DCU selection. For smaller projects, such DCU systems are commercially available, such as various high-vacuum cyclone separator dust collection systems available from Oneida Air Systems, Syracuse, N.Y., U.S.A. These systems typically feature high static air pressure system for CNC, sanding, and other fine dust applications. Complete systems may include heavy-gauge steel cyclone(s), motor(s), wide-pleated spunbond cartridge filter(s), plenum, stand, drum for dust collection, and cord for power. Certain models operate at 230V, 19.5 A, 1-phase motor, with 8 inch inlet, capacity of 2,150 CFM, and operate at from 75 to 81 decibels (dB). Other models operate at 3-phases, and employ variable speed motors operating at from 208 to 230V and 14 A, at 1,789 CFM. Other models may include a rotary airlock, a silencer, and other features. Direct drive systems (7.5, 10, 15, and 20 horsepower (hp) units) and belt/pulley drive systems may be employed in certain embodiments.

In certain embodiments, higher capacity AEUs and DCUs may be employed, such as when thermal spray dust is being collected from a work site. One suitable AEU/DCU may be the unit known under the trade designation TORIT DOWN-FLO OVAL, sometimes referred as "DFO", commercially available from Donaldson Filtration Solutions, Bloomington, Minn., U.S.A. As noted on the Donaldson website, thermal spray processes use a heat source, like electric arc spray, plasma or flame spray, to melt metallic or nonmetallic materials and propel them onto a substrate. Managing the overspray in the habitat may be challenging because the particulate (sometimes referred to in the art as "fume") is very small—typically less than a micron in size. Cartridge filters known under the trade designation TORIT ULTRA-WEB cartridge filters available from Donaldson have a layer of nanofibers that capture particles in the submicron sizes down to 0.3 µm. The nanofiber layer also enables surface-loading, allowing self-cleaning by compressed air pulse of the DFO dust collector. Compressed air pulse self-cleaning is reported by Donaldson to be able to clean the filters effectively—keeping pressure drop low over the life of the filter and extending filter life. The airflow in such units may range from about 100 to about 100,000 cubic feet per minute (CFM)(from about 170 to about 170,000 m³/hr.), and from 1 to 128 filter cartridges, or more. The units may comprise a cyclone pre-cleaner that may include a rotary valve feeding a drum for dust collection, and may include a HEPA post-filter.

Referring again to FIG. 1, one or more HVAC units (16) are provided, with associated one or more chilled (or warmed) air blowers 18. The primary function is to maintain temperature and humidity levels within certain limits to facilitate blasting and/or thermal spray application. A benefit of the HVAC units is to provide a better working environment for workers and prevent heat stress inside the habitats under some conditions because the enclosed area may get very hot near an online heat exchanger or hot pipes. More specifically, the HVAC units 16 and air blowers 18 provide chilled or warmed air to achieve temperature and humidity inside the habitats within defined set point ranges. Temperature set point inside the habitats may range from about 40 to about 85° F. (from about 4 to about 29° C.), or from about 65 to about 75° F. (from about 18 to about 24° C.), or from about 68 to about 72° F. (from about 20 to about 22° C.). Comfortable ranges of RH may range from about 20 to about 70 RH, or from about 35 to about 65 RH, or from about 40 to about 60 RH. Care should be taken to avoid too low RH in order to avoid static charges. Too high RH (above 70 RH) is normally considered uncomfortable and not suitable for blasting or thermal spray application. Certain system and method embodiments may comprise, or consist essentially of, or consist of controlling moisture content of the air inside the habitat by one or more control methods selected from the group consisting of monitoring absolute humidity (AH) or relative humidity (RH) of the HVAC inlet air stream, monitoring absolute humidity (AH) or relative humidity (RH) of the HVAC outlet air stream (cooled or warmed), monitoring one or more humidities (AH or RH) of air steams and/or heated air streams entering the habitat(s), and combinations thereof. One or more temperatures may be measured at these locations. Temperature and AH or RH (or both) may be measured inside and/or outside the habitats. Indicators for temperature and AH or RH inside the habitats may be viewable from outside the habitats through one or more windows or doors in the habitat panels 4. Similarly, indicators for temperature and AH or RH outside the habitats may be viewable from inside the habitats through one or more windows or doors in the habitat panels 4.

Conventionally, a psychrometer of the type including temperature sensors such as platinum resistance bulbs, thermocouples, or thermistors are employed as a humidity sensor for effecting humidity control in constant temperature and humidity environments, such as explained in U.S. Pat. No. 4,911,357. In general, as explained in the '357 patent, relative humidity is computed from the temperature difference between the dry and the wet bulb so that humidity control is affected accordingly. The humidity computing method by such a psychrometric method is known as defined under JIS (Japanese Industrial Standard) 8806. Humidity sensors of other than the psychrometer are, for example, resistive and capacitive humidity sensors, which utilize variations in their electrical characteristics that are caused by adsorption. They include, but are not limited to, an electrolytic lithium chloride humidity sensors, an organic high polymer film humidity sensors, and metallic oxide ceramics humidity sensors.

Figure 2:
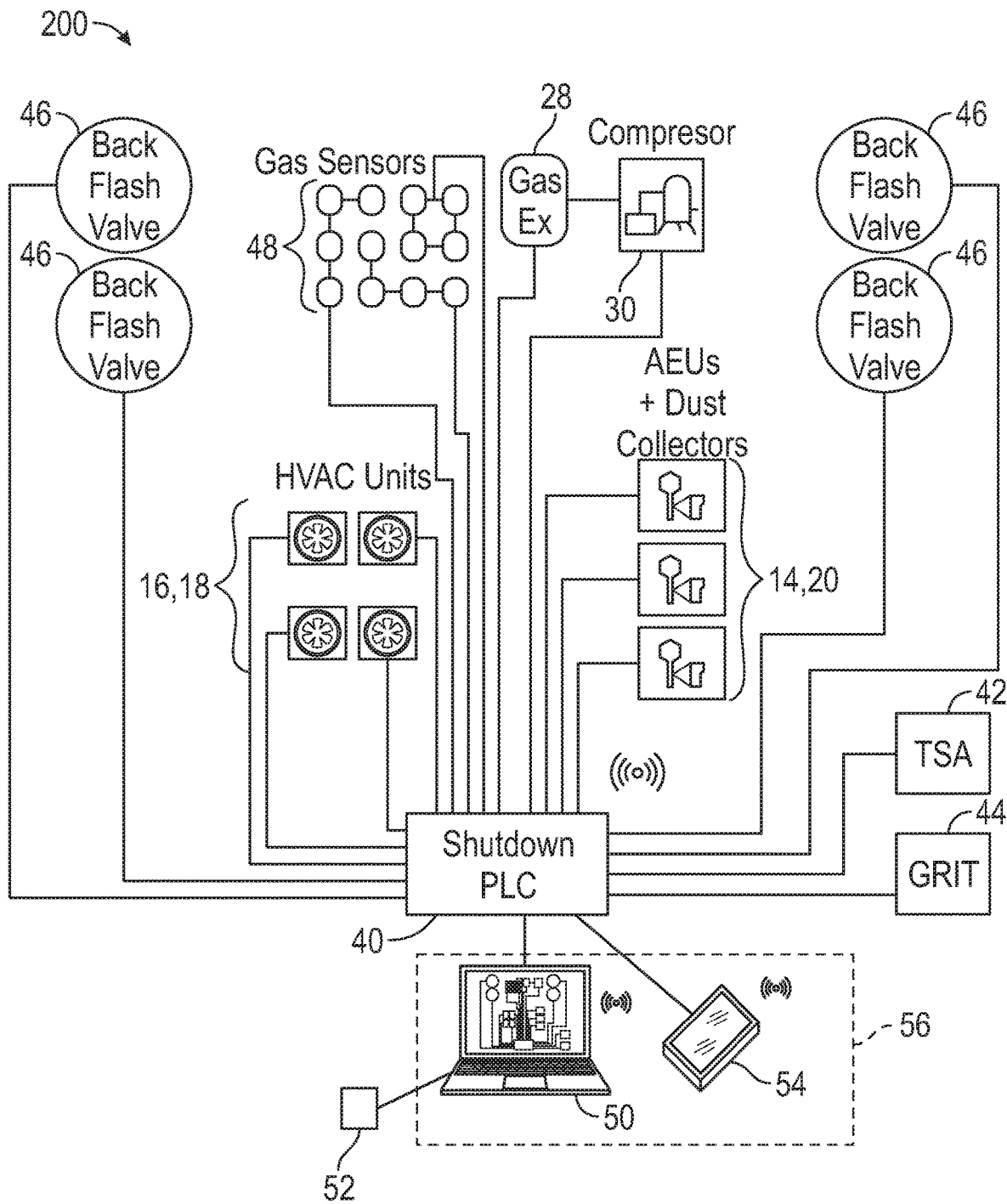
FIG. 2 is a schematic view illustrating wired or wireless communications between a PLC and other components of one system and method embodiment of the present disclosure.

During a maintenance operation, one or all of T, P, AH, RH, gas or vapor concentrations (or percentages of set point values) inside and/or outside the habitat(s) may be displayed locally on Human Machine Interface (HMI), such as a laptop 50 (FIG. 2) having display screen having a graphical user interface (GUI), or handheld device 54 or similar inside and/or outside (or both) of habitat 2. In certain embodiments HMI 50, 54 may record and/or transmit the data via wired or wireless communication to another HMI, such as a laptop, desktop, or hand-held computer or display. While FIG. 2 is drawn with solid lines between the various components, these communication links may be wired or wireless. Wireless communication capability is indicated by the wireless symbol $(((\cdot)))$ in FIG. 2 next to laptop 50 and handheld device 54.

Various flexible conduits 22, 24, such as hoses or other flexible ducts, fluidly connect habitat 2 with various components. For example, in embodiment 100 illustrated schematically in FIG. 1, flexible conduits 22 fluidly connect various habitats 2, AEUs 20, and DCUs 14. Flexible conduits 24 fluidly connect habitats 2, HVACs 16, and HVAC blowers 18. One example of a flexible duct that may be used is available from Global Industrial, Inc., has flame retardant properties, and may easily connect to blower fans. The ducts may include a quick-connect coupling for blower attachment. The ducts themselves may be made with 2-ply reinforced polyvinyl that is flame retardant and withstands −20° to 180° F. temperatures, and may be yellow and black in color for ease of seeing, or other colors.

Referring again to FIG. 1, system and method embodiment 100 includes an emergency gas evacuation sub-system (EGES) designated at 28 in FIG. 1. The primary function of the EGES is to extract explosive, flammable, and poisonous gases from the habitats when commanded to do so. The EGES does not operate at all times during maintenance, although in certain embodiments it may be preferable to operate the EGES for a brief time period (for example 10, 5, or 1 minute) for testing purposes, and to ensure that any explosive, flammable, and poisonous gases are removed (or at least reduced to acceptable levels) from the habitat before work begins. "Acceptable" levels may vary by the gas or vapor, according to their LEL, UEL, and recommended limit of concentration and/or duration to exposure. (For example, the exposure limits for hydrogen sulfide ($H_2S$) are covered extensively by state and federal government regulations in the United States, some of which are listed in an Appendix hereto.) In certain embodiments the EGES may extract all gases and vapors, even dust and grit, from the habitats on command by the logic device. In certain embodiments, the EGES may be configured and dimensioned to extract gases based on a leak rate of a possible leak and/or other emissions. For example if there is a leak of hydrocarbon of 15 m³/min then the EGES may be configured and dimensioned to remove more than 15 m³/min. That will mean that in some embodiments, systems and methods of this disclosure may develop "more negative" pressure than the operating negative pressure in any given habitat. Evacuation of gases and/or vapors may in certain embodiments be accomplished using one or more large capacity blowers. Certain embodiments may employ one or more Venturi eductors or jets employing a motive fluid. If pressurized steam or other gas (such as nitrogen from an air separation plant) is available, that may be used as motive gas for the Venturi of the EGES, and a dedicated air compressor may by used as a back-up source of compressed motive gas. Liquids may also be used as a motive fluid, such as water. In certain embodiments, the EGES may comprise one or more Venturi eductors and one or more compressors, such as air compressors, supplying the motive fluid.

Referring to FIG. 1, certain embodiments of the EGES 28 include hard ducts running from each habitat in use to a flame arrestor (31) mounted on the top of the roof of the facility (or the habitat itself, depending on the project) with a distance of at least 3 meters (or at least 4 meters, or at least 5, or 6, or 7, or 10 meters) from the top of the work area. In certain embodiments the hard ducts may comprise horizontally disposed sections or portions (32) fluidly connecting each habitat to a vertically mounted hard duct 26 that leads to the roof and to flame arrestor 31. In certain embodiments each horizontal duct 32 may be mounted with a one-way vent 46 (sometimes referred to as back flash valves, or check valves, or check vents) inside the middle of the duct to protect against possible back flashes, thus not being able to open without negative or at least reduced air pressure created from the EGES and thus pulling them open. As noted, the EGES may utilize a Venturi type air system in order to maintain negative pressure within the habitat during an emergency gas extraction. In certain embodiments EGES 28 may comprise one or more compressors (air or other gas compressor 30 (not illustrated in FIG. 1)). The compressor may be mounted in the vicinity of EGES 28 as illustrated in FIG. 1, or may be located on the ground or floor of the facility for easier access. The EGES is able to remove large amounts of air and gas in a relatively short period of time. If pressurized steam or other gas (such as nitrogen from an air separation plant) is available, that may be used as motive gas for the Venturi of the EGES, and a dedicated air compressor may by used as a back-up source of compressed motive gas. Liquids may also be used as a motive fluid, such as water.

In any case, in exemplary embodiments EGES includes one or more Venturi nozzles (series or parallel, or both) through which the compressed gas passes. The compressor(s) provide a motive force for creating a low-pressure region in the restriction of the Venturi. This low-pressure region is fluidly connected to the habitats through vertical hard duct 26 and horizontal hard ducts 32, and when in operation serves the function of extracting explosive, flammable, and poisonous gases from the habitats. Suitable Venturi gas jet ejectors (sometimes referred to as eductors) are available form a variety of commercial suppliers, such Fox Venturi Products, Dover, N.J., U.S.A. Systems may employ motive fluid (compressed air, high or low pressure steam, compressed nitrogen, or other compressed fluid, such as synthetic air supplied from an air separation unit) at pressures ranging from 1 to about 1500 psig (from about 7 to about 1,050 kPa), line sizes ranging from 1 to about 42 inches (2.5 cm to about 100 cm), and to create vacuum ranging from moderate from about 8 to about 12 psia) to extreme (8 psia or less (56 kPa or less), or 6 psia or less (42 kPa or less), or 4 psia or less (28 kPa or less), or 2 psia or less (14 kPa or less), to below 1 psia (below 7 kPa)).

The Venturi gas jet(s) itself may be made of materials selected from metals and plastics. Suitable metals include stainless steel, MONEL, HASTELLOY, titanium, alloy 20, aluminum, or any machinable metal. Suitable plastics include PVC, CPVC, TFE-Lined, PVDF-Lined. Corrosion-resistant alloys may be preferred in certain sour gas or other service where $H_2S$ or acid gases or vapors may need removal from habitats, such as T304 stainless steel (or analogs thereof, such as UNS 530400; AMS 5501, 5513, 5560, 5565; ASME SA182, SA194 (8), SA213, SA240; ASTM A167, A182, A193, A194) or T316 stainless steel (or analogs thereof, such as UNS 531600, SS316, 316SS, AISI 316, DIN 1.4401, DIN 1.4408, DIN X5CrNiMo17122, TGL 39672 X5CrNiMo1911, TGL 7143X5CrNiMo1811, ISO 2604-1 F62, ISO 2604-2 TS60, ISO 2604-2 TS61, ISO 2604-4 P60, ISO 2604-4 P61, ISO 4954 X5CrNiMo17122E, ISO 683/13 20, ISO 683/13 20a, ISO 6931 X5CrNiMo17122, JIS SUS 316 stainless steel, or the alloy known under the trade designation MONEL® nickel-copper alloy 400. The composition and some physical properties of MONEL® nickel-copper alloy 400 are summarized in Tables 1 and 2 (from Publication Number SMC-053 Copyright © Special Metals Corporation, 2005). The composition and some physical properties of T304 and T316 stainless steels are summarized in Tables 3 and 4. MONEL® nickel-copper alloy 400 (equivalent to UNS N04410O/W.Nr. 2.4360 and 2.4361) is a solid-solution alloy that can be hardened only by cold working. It has high strength and toughness over a wide temperature range and excellent resistance to many corrosive environments. In embodiments where $H_2S$ is to be extracted from a habitat, steam jacketed ejectors, maintaining internal gas temps above 280° F. (140° C.) to prevent solidification, may be employed.

TABLE 1

Chemical Composition, wt. %, of MONEL ® Alloy 400

| | |
|---|---|
| Nickel (plus Cobalt) | 63.0 min. |
| Carbon | 0.3 max. |
| Manganese | 2.0 max. |
| Iron | 2.5 max. |
| Sulfur | 0.024 max. |
| Silicon | 0.5 max. |
| Copper | 28.0-34.0 |

TABLE 2

Physical Constants of MONEL ® Alloy 400[a]

| | |
|---|---|
| Density, g/cm$^3$ | 8.80 |
| lb/in.$^3$ | 0.318 |
| Melting range, ° F. | 2370-2460 |
| ° C. | 1300-1350 |
| Modulus of Elasticity, 10$^3$ ksi | |
| Tension | 26.0 |
| Compression | 26.0 |
| Torsion | 9.5 |
| Poisson's Ratio | 0.32 |
| Curie Temperature, ° F. | 70-120 |
| ° C. | 21-49 |

[a]these values also apply to MONEL alloy R-405, the free-machining version of MONEL alloy 400.

TABLE 3

Chemical Composition, wt. %, of T304 and T316 SS

| | T304 | T316 |
|---|---|---|
| Carbon | 0.08 max. | 0.08 |
| Chromium | 18-20 | 18 max. |
| Manganese | 2.0 max. | 2 |
| Molybdenum | 0 | 3 max. |
| Iron | 66.345-74 | 62 |
| Nickel | 8-10.5 | 14 max. |

TABLE 3-continued

Chemical Composition, wt. %, of T304 and T316 SS

|  | T304 | T316 |
|---|---|---|
| Phosphorous | 0.045 max. | 0.045 |
| Sulfur | 0.03 max. | 0.03 |
| Silicon | 1 max. | 1 |

TABLE 4

Physical Constants of T304 and T316 SS

|  | T304 | T316 |
|---|---|---|
| Density, g/cm$^3$ | 8 | 8 |
| lb/in.$^3$ | 0.289 | 0.289 |
| Melting range, ° F. | 2550-2650 | 2500-2550 |
| ° C. | 1400-1455 | 1370-1400 |
| Modulus of Elasticity, 10$^3$ ksi | 28-29 | 28 |
| Poisson's Ratio | 0.29 |  |
| CTE, linear 250° C | 9.89 μin/in-° F. | 9 μin/in-° F. |

Referring once again to embodiment 100 illustrated schematically in FIG. 1, habitat 2 has in this embodiment interior and exterior gas or vapor concentration sensors 48, at least one, preferably more than one for redundancy, for each gas or vapor to be sensed. In any case, the number of gas and/or vapor sensors will be sufficient to provide an accurate and representative reading of the gas and/or vapor concentrations, perhaps ranging from 1 to about 10, or from about 2 to about 8, or from about 4 to about 8, inclusive. Explosive, flammable, and/or poisonous gases and vapors that may be sensed include those selected from the group consisting of natural gas, methane, ethane, ethylene oxide, hydrogen sulfide, oxygen, nitrogen, argon, hydrogen, carbon dioxide, carbon monoxide, propane, butane, pentane, and combinations and mixtures thereof.

Embodiment 100 and other embodiments may employ, instead of an HVAC unit, a unit that supplies chilled or heated "synthetic air", in other words, 21% $O_2$, 79% $N_2$, such as could be produced by combining $O_2$ and $N_2$, for example produced by one or more air separation units, which could be membrane units, adsorption units, cryogenic air separation units. As used herein "HVAC unit" is meant to include this option.

Referring now FIG. 2, FIG. 2 is a schematic view illustrating wired or wireless communications between a PLC and other components of an embodiment 200 of systems and methods of the present disclosure. In particular, it should again be emphasized that the solid lines connecting each component to the PLC 40 are merely symbolic of communications links or channels between PLC 40 and each of back flash valves 46, gas sensors 48, EGES 28, compressor 30, HVAC units and blowers 16, 18, AUEs/DCUs 14, 20, and HMI 50. Any or all of these communications channels may be hard wired or wireless communication links or channels. In addition, a power source 52 is illustrated, which in most embodiments will be a wired connection with a battery backup. This is due to the fact that all power distribution and disconnect is controlled from the PLC. Power source 52 could be wirelessly connected, for example power source 52 may be a battery pack internal to HMI 50 or 54. The dashed line box in FIG. 2 represents a security box 56, discussed more in relation to FIGS. 5 and 6. Also illustrated schematically are "TSA" 42 and "grit" 44, which represent thermal spray procedures and blasting procedures, respectively, being carried out inside habitat 2. These operational equipment 42 and 44, as well as other not illustrated (for example painting, welding, brazing, hot-tapping, and similar operational equipment) are in communication with and controlled by PLC 40 in terms of shutdown upon an adverse event.

Figure 3A:
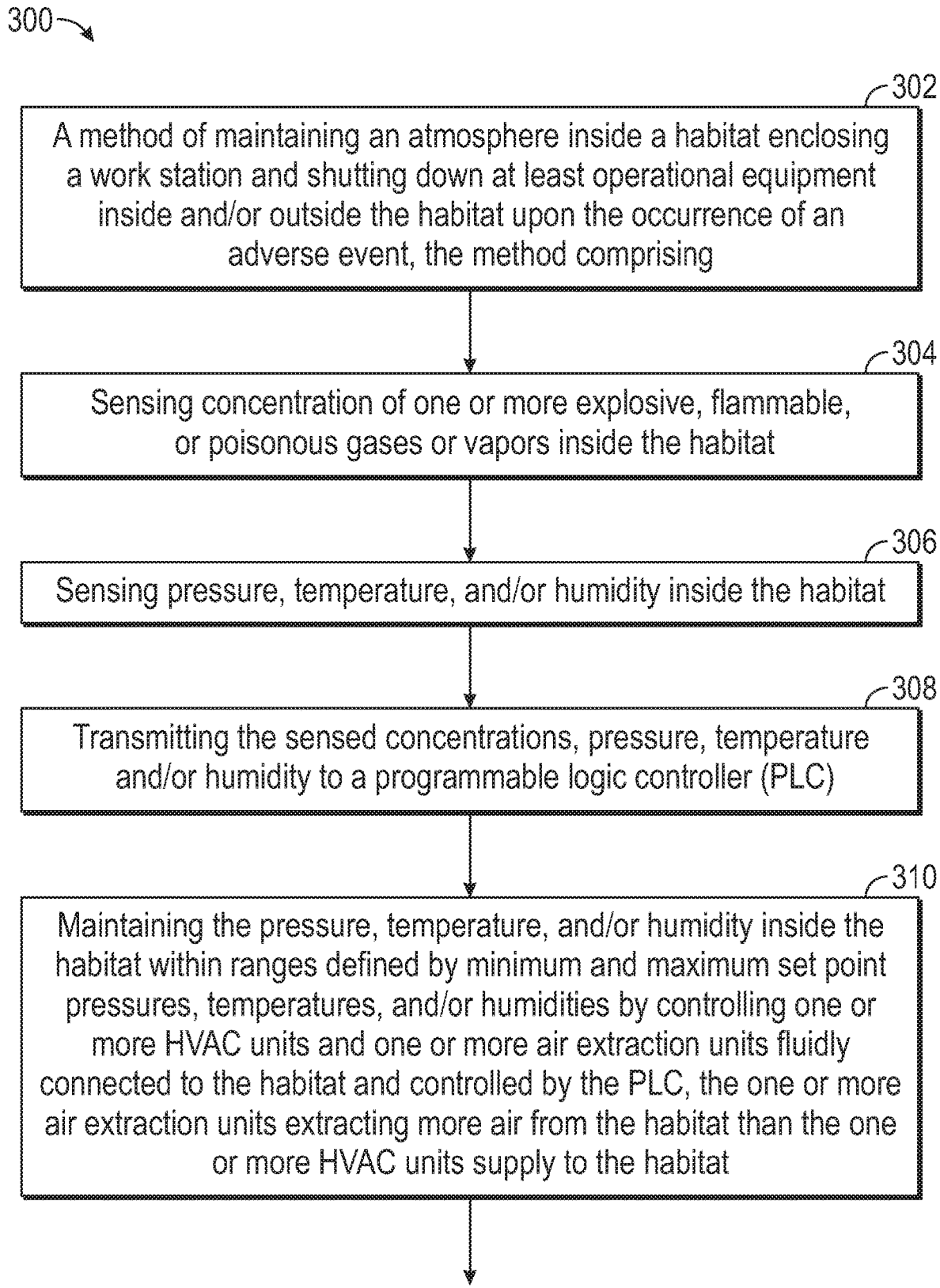

FIGS. 3A and 3B together present a schematic logic diagram of one method embodiment 300 of maintaining an atmosphere inside a habitat enclosing a work station and shutting down one, more than one, or all operational equipment inside and/or outside the habitat (for example as dictated by the client, law, or regulation), in certain embodiments at least operational equipment inside the habitat, upon the occurrence of an adverse event in accordance with the present disclosure. Method embodiment 300 comprises, consists essentially of, or consists of maintaining an atmosphere inside a habitat enclosing a work station and shutting down at least operational equipment inside the habitat upon the occurrence of an adverse event (Box 302), the method including sensing concentration of one or more explosive, flammable, and/or poisonous gases or vapors inside the habitat, Box 304, sensing pressure, temperature, and/or humidity inside the habitat, Box 306, and transmitting the sensed concentrations, pressure, temperature, and/or humidity to a programmable logic controller (PLC), Box 308. Method embodiment 300 further includes the option of maintaining the pressure, temperature, and/or humidity inside the habitat within ranges defined by minimum and/or maximum set point pressures, temperatures, and/or humidities by controlling one or more HVAC units and one or more air extraction units fluidly connected to the habitat and controlled by the PLC, the one or more air extraction units extracting more air from the habitat than the one or more HVAC units supply to the habitat, Box 310. Method embodiment 300 further includes extracting dust from the habitat employing one or more dust collection units fluidly connected to the one or more air extraction units and controlled by the PLC, Box 312, and extracting the explosive, flammable, and/or poisonous gases or vapors from inside the habitat employing an emergency gas extraction sub-system (EGES), an intake of the sub-system fluidly connected to the habitat, the EGES controlled by the PLC, upon concentration of one or more of the explosive, flammable, and/or poisonous gases or vapors exceeding one or more maximum set point concentrations, Box 314. Method embodiment 300 further includes transmitting one or more signals from the PLC shutting down one, more than one, or all operational equipment inside the habitat upon the PLC receiving one or more adverse event signals selected from the group consisting of i) a pressure rise in the sensed pressure above the maximum set point pressure inside the habitat, the maximum set point pressure being less than atmospheric pressure; ii) a rise in concentration of one or more of the one or more sensed concentrations above the one or more maximum set point concentrations; and iii) combination of i) and ii), Box 316.

Figure 4A:
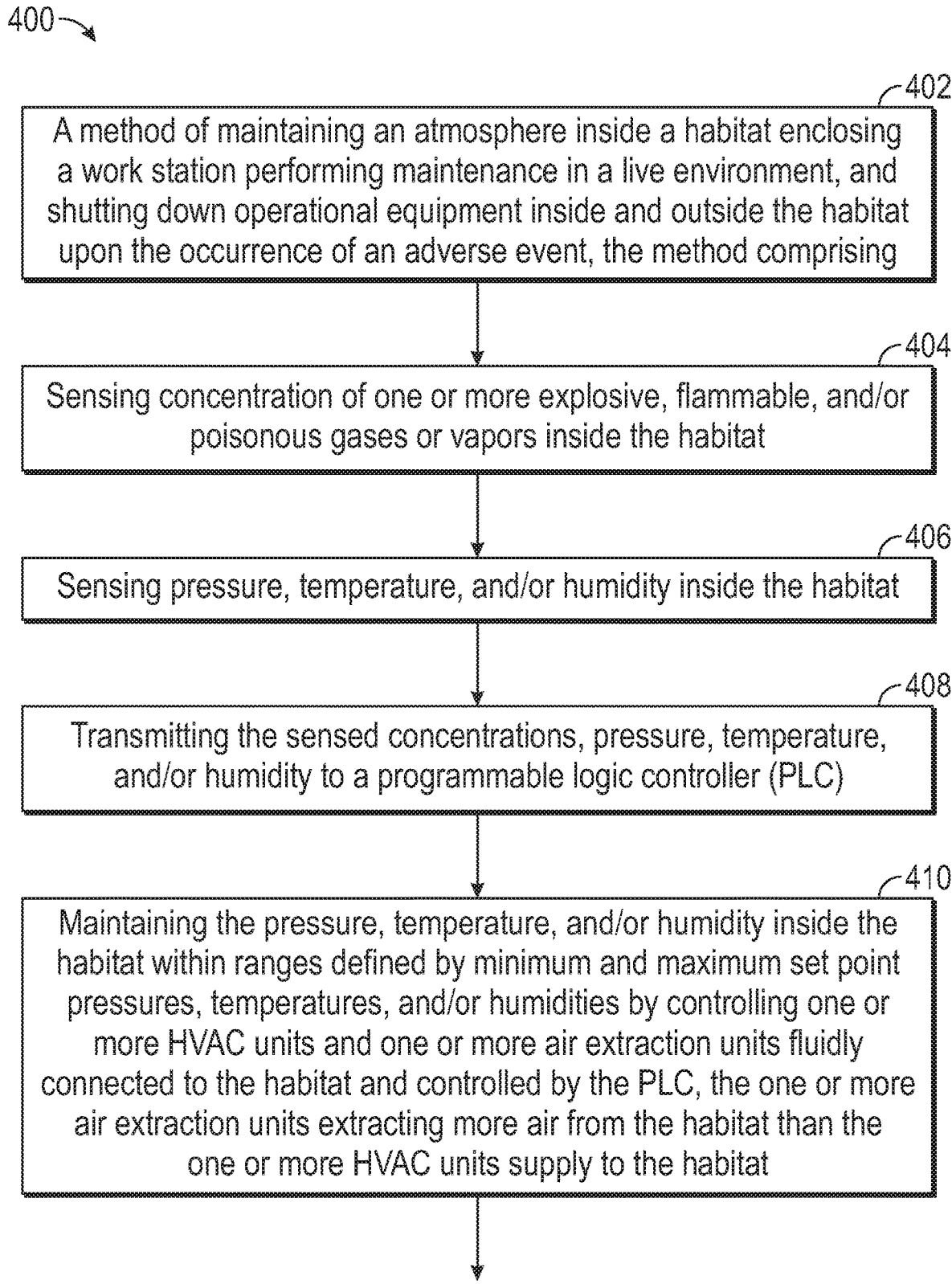

FIGS. 4A and 4B together present a schematic logic diagram of another method embodiment 400 of maintaining an atmosphere inside a habitat enclosing a work station and shutting down one, more than one, or all operational equipment inside and/or outside the habitat (for example as dictated by the client, law, or regulation), in certain embodiments at least operational equipment inside the habitat, upon the occurrence of an adverse event in accordance with the present disclosure. Method embodiment 400 comprises, consist essentially of, or consists of a method of maintaining an atmosphere in a habitat enclosing a hot work station, and shutting down one, more than one, or all operational equipment inside and outside the habitat upon the occurrence of an adverse event, Box 402, the method including sensing concentration of one or more explosive, flammable, and/or poisonous gases or vapors inside the habitat, Box 404, and sensing pressure, temperature, and/or humidity inside the habitat, Box 406. Method embodiment 400 further includes transmitting the sensed concentrations, pressure, temperature, and/or humidity to a programmable logic controller (PLC), Box 408, and maintaining the pressure, temperature, and/or humidity in the habitat within ranges defined by minimum and/or maximum set point pressures, temperatures, and/or humidities by controlling one or more HVAC units and one or more air extraction units fluidly connected to the habitat and controlled by the PLC, the one or more air extraction units extracting more air from the habitat than the one or more HVAC units supply to the habitat, Box 410. Method embodiment 400 further includes extracting blasting dusts from the habitat employing one or more dust collection units fluidly connected to the one or more air extraction units and controlled by the PLC, Box 412. Method embodiment 400 further includes extracting the explosive, flammable, and/or poisonous gases or vapors from the habitat employing an emergency gas extraction sub-system (EGES), an intake of the EGES fluidly connected to the habitat, the EGES controlled by the PLC, upon concentration of one or more of the explosive, flammable, and/or poisonous gases or vapors exceeding one or more maximum set point concentrations, Box 414. Method embodiment 400 further includes transmitting one or more signals from the PLC shutting down one, more then one, or all operational equipment inside and outside the habitat upon the PLC receiving one or more signals selected from the group consisting of: i) a pressure rise in the sensed pressure above the maximum set point pressure, the maximum set point pressure being less than atmospheric pressure; ii) a rise in concentration of one or more of the one or more sensed concentrations above the one or more maximum set point concentrations; and iii) combination of i) and ii), Box 416.

Figure 5:
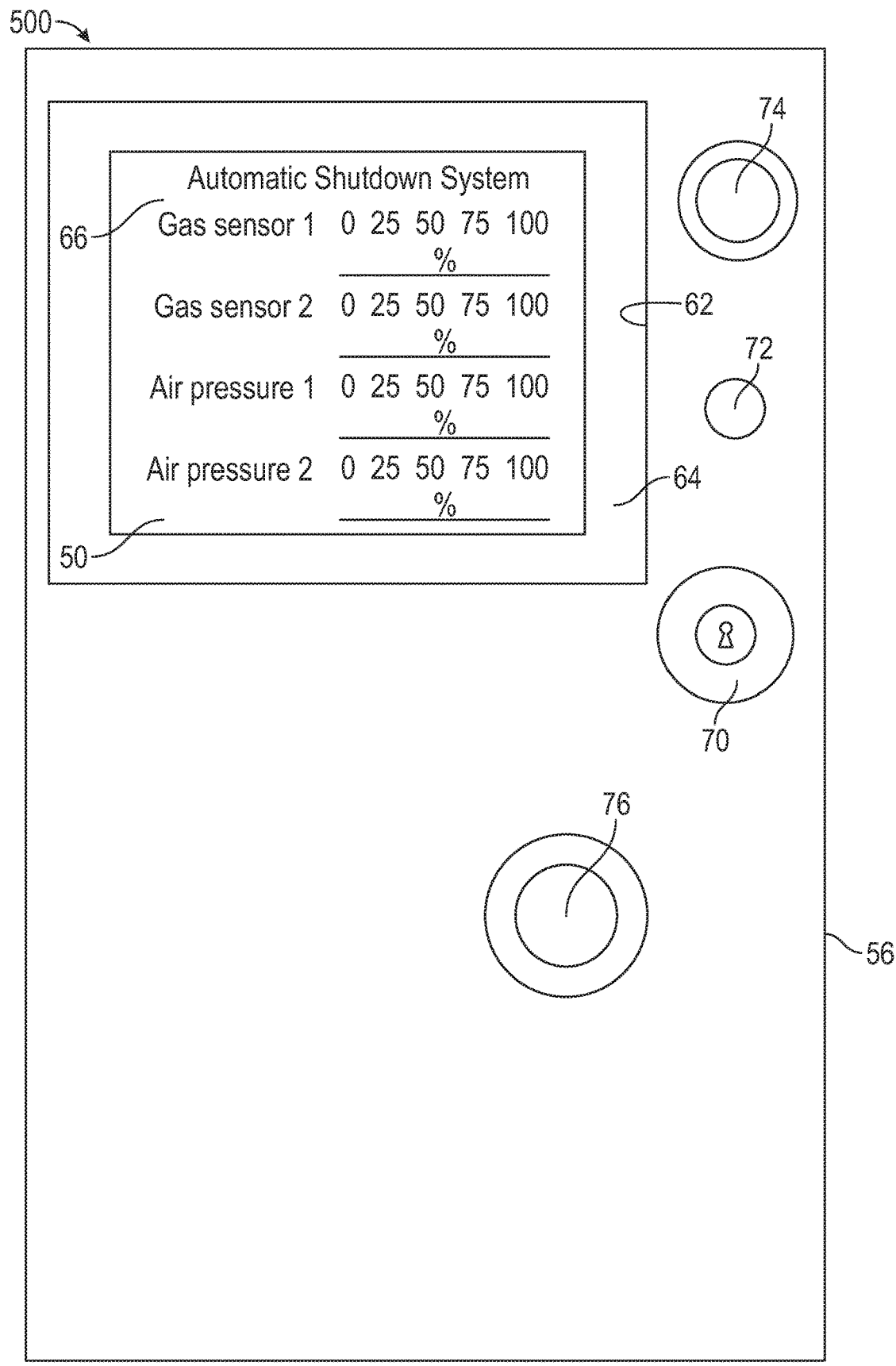
FIG. 5 is a frontal elevation view of one embodiment of a secure cabinet enclosing a human/machine interface having an animated graphical user interface in accordance with the present disclosure.

FIG. 5 is a frontal elevation view of one embodiment 500 of a secure cabinet 56 enclosing a human/machine interface 50 having a display screen 66 having an animated graphical user interface in accordance with the present disclosure. Secure cabinet 56 includes a window frame 62, a window 64, a lock with key access 70, and access door knob 72, and emergency manual shutdown button 74 (which may be colored red), and a second emergency shut down button 76 (which may also be colored red). Shutdown buttons 74, 76 may be configured to shut down one, more than one, or all operational equipment inside and/or outside the habitat (for example as dictated by the client, law, or regulation).

Figure 6:
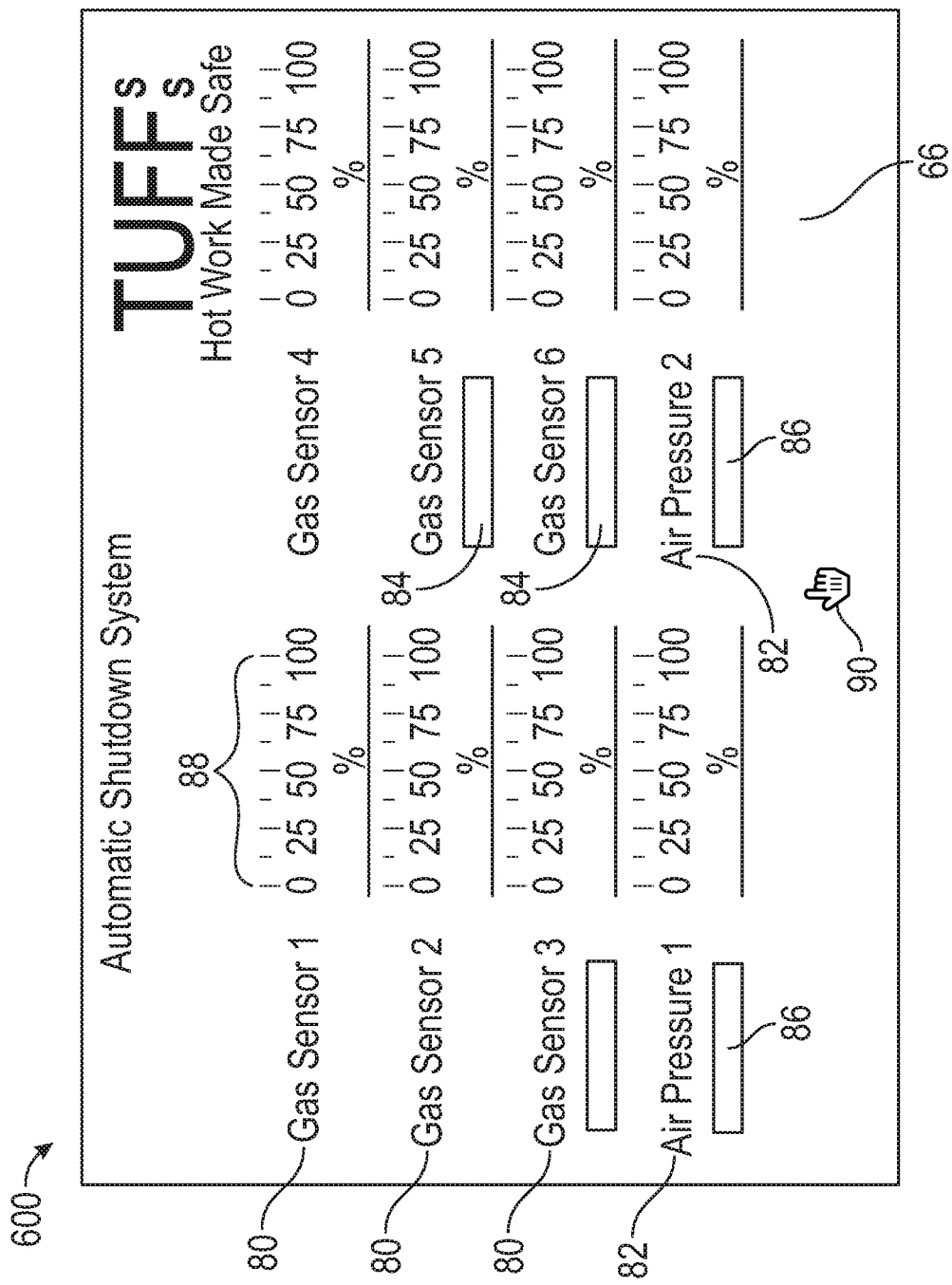
FIG. 6 is a frontal elevation view of another embodiment of a human/machine interface having an animated graphical user interface in accordance with the present disclosure.

FIG. 6 is a frontal elevation view of another embodiment 600 of a human/machine interface 50 having a display screen 66 having an animated graphical user interface in accordance with the present disclosure, illustrating schematically several (six) gas sensor indicia 80, two air pressure sensor indicia 82, gas sensor indicator lights 84 (three illustrated) which may be colored red, and air pressure indicator lights 86 (two illustrated) which may also be colored red. Scales from 0 to 100 percent, graduated in 25 percentiles, are indicated at 88 for each gas sensor indicia 80 and each air pressure sensor indicia 82. A hand tool icon 90 is illustrated, sometimes referred to as a hand grabber icon, or grabber hand icon, which allows a user to change set points and otherwise interact with the PLC 40 (FIG. 2).

Safety shutdown systems of the present disclosure and habitats in which they may be used in may be built to meet ISO standards, Det Norske Veritas (DNV) standards, American Bureau of Standards (ABS) standards, American Petroleum Institute (API) standards, or other standards.

Once a habitat and safety shutdown system of the present disclosure is in place at a work area, a power supply will be attached, or of already on board the system (for example in the PLC 40, secure cabinet 56, or HMI 50 as one or more batteries), initiated. The operator may then test the system components, for example sensors, HVCA, AEUs, DCUs, and EGES compressor. Gas and vapor sensors (sometimes referred to as detectors) may be placed at reasonable locations outside the habitat at the air intake and designated points to detect any dangerous gases before they reach the inside of the habitat. Additionally, the operator will ensure the sensors inside and/or outside the habitats are operable to detect any possible gas leaks. The gas detection/shutdown system may be designed as an emergency shutdown system that is capable of giving audio and visual warning based on gas sensor readings at the air intake to and/or inside the habitat to enable manual shutdown or automatic termination. An audio alarm may be provided having at least 90 or at least 95, or at least 100, or at least 105 db sound in a unique sound not to be confused with other alarms or equipment. The shutdown system may be controlled by one or more logic devices (PLC, analog device, or combination thereof), which can be placed inside or outside of the habitat. The shutdown system monitors presence of explosive, flammable, and/or poisonous gases and air pressure within the habitat. The shutdown system controls the HVAC, AEU, DCU, and EGES, and one, more than one, or all operational equipment inside and/or outside the habitat (for example as dictated by the client, law, or regulation), in certain embodiments all operational equipment used within the habitat to perform work (i.e. welding, grinding, blasting, painting, thermal spray application, etc.). In case of detection of explosive, flammable, and/or poisonous gases or increase of pressure inside the habitat above atmospheric pressure, one, more than one, or all operational equipment inside and/or outside the habitat (for example as dictated by the client, law, or regulation), whether electrical, hydraulic, fuel-driven, and/or pneumatic, can and will be shutdown automatically. It is also possible for a worker (preferably a certified technician) to perform a manual shutdown if deemed necessary. Regardless of whether manual or automatic shutdown is employed, the shutdown system will shut down one, more than one, or all operational equipment inside and/or outside the habitat (for example as dictated by the client, law, or regulation) except for the compressor or other source supplying the motive fluid for the EGES. This compressor operates off a separate power system, and may be operated by a diesel, natural gas, or other powered generator.

The electrical connection (voltage and amperage) will be appropriate for the zone rating desired of the system. In certain embodiments one or more electrical cables may be run and connected to an identified power supply at the work site to operate the HMI, gas sensors, HVAC and blowers, AEUs, and optional DCUs. Certain embodiments may employ a dedicated power supply. The identified or dedicated power supply is controlled by the one or more logic devices so that it may be shut down. In exemplary embodiments, systems of the present disclosure may have an electrical isolation (lockout) device on the secure cabinet 56.

In embodiments where connection to one or more remote HMI units is desired, this may be achieved by an intrinsically safe cable and connection so as to allow system components to operate in the required zoned area. If no remote access is required, power to operate the HMI, gas sensors, HVAC, AEUs, and DCUs may be integral to the apparatus, such as batteries, for example, but not limited to, Li-ion batteries. In these embodiments, the power source may be enclosed allowing it to operate in a zoned area (Zone 0 (gases) in accordance with International Electrotechnical Commission (IEC) methods). By "intrinsically safe" is meant the definition of intrinsic safety used in the relevant IEC apparatus standard IEC 60079-11, defined as a type of protection based on the restriction of electrical energy within apparatus and of interconnecting wiring exposed to a potentially explosive atmosphere to a level below that which can cause ignition by either sparking or heating effects. For more discussion, see "AN9003—A User's Guide to Intrinsic Safety", retrieved from the Internet Jul. 12, 2017, and incorporated herein by reference.

With the habitat in place on a piece of equipment to be worked upon, and a safety shutdown system of the present disclosure connected thereto either by hardwire or wirelessly, the gas sensors display initial concentrations of hazardous gases, while the pressure sensors display initial pressures. As the welding, thermal spray, or other operation proceeds, one or more gas sensors 48 provide a local reading of gas concentration at the location of the gas sensors. Depending on how many gas sensors are employed and where, and how many are activated or working, each provides a gas sensor reading, for example on a display screen having an animated GUI, as illustrated schematically in FIGS. 5 and 6. The number and location of gas sensors and pressure (or differential pressure) sensors used depends on the design of habitat 2, the type of gases or vapors being processed in the plant or facility, and range of pressures that might be encountered, both in normal operations and in upset conditions, as well as shutdown periods. The number of gas sensors may range from 1 to 10 or higher, or from 1 to 6 or from 1 to 4. In certain embodiments, such as embodiment 200 illustrated schematically in FIG. 2, twelve gas sensors 48 may be used, positioned about the habitat internally and externally as desired by the work team or the owner of the work site, and/or as dictated by environmental conditions (prevailing wind speed and direction, expected change of wind speed and direction, temperature, and the like).

In certain embodiments the systems and methods may have the option of shutting down the HVAC and/or starting the EGES automatically when one or more gas sensors and/or one or more pressure sensors register a pre-defined gas concentration or pressure difference, for example more than 1 percent, or more than 2 percent, or more than 5 percent, or more than 10 percent or higher in terms of gas concentration, or more than 10 psi, or more than 20 psi, or more than 50 psi gas pressure or gas pressure differential. In certain embodiments, when the difference reading between two or more gas sensors increases to a pre-defined threshold, the safety shutdown system may automatically shut off one, more than one, or all operational equipment inside and/or outside the habitat (for example as dictated by the client, law, or regulation), whether electrical, hydraulic, fuel-driven, or pneumatic equipment. Alternatively, in certain other method and system embodiments, the EGES may be manually switched on and off depending on which mode (continuous, periodic, or manual) the operator wishes to run the system and perform the method.

In certain embodiments, internal algorithms in the logic device, such as PLC 40, may calculate a rate of increase in concentration, or a rate of increase or decrease in pressure inside the habitat. This may then be displayed or audioed in a series of ways such as "percentage to shutdown" lights or sounds, and the like on one or more GUIs. In certain embodiments, an additional function within a HMI may be to audibly alarm when the calculated pressure rate of increase or decrease reaches a level set by the operator. In certain embodiments this alarm may be sounded inside the habitat, outside the habitat, as well as remote from the habitat, for example in a control room.

Habitats, safety shutdown systems, sensors, logic devices, and associated HVAC, AEU, and EGES should be capable of withstanding long term exposure to probable liquids and vapors, including hydrocarbons, acids, acid gases, fluids (oil-based and water-based), solvents, brine, anti-freeze compositions, hydrate inhibition chemicals, and the like, typically encountered in offshore and onshore processing facilities.

What has not been recognized or realized is a system and method to perform maintenance in a live (on-line) environment on equipment safely and with fewer injuries to workers, in particular in LNG, crude oil refineries, and petrochemical plants. Systems and methods to accomplish this without significant risk to workers are highly desirable. As explained previously, rather non-technical and unsafe systems and methods exist, but personnel do not necessarily favor these methods. The present inventors, however, personally know of the inefficiencies of such practices and the inherently unsafe conditions they create. Multiple accidents have injured workers, and/or exposed workers unnecessarily to noxious fumes, explosions, or fires on working equipment. As an additional safety feature, in practice, for example for offshore use, the habitats and safety shutdown systems of the present disclosure may be painted or otherwise colored or made reflective for ease of recognition.

In alternative embodiments, the habitat need not be rectangular, as illustrated in the drawings, but rather the habitat could take any shape, such as a box or cube shape, elliptical, triangular, prism-shaped, hemispherical or semi-hemispherical-shaped (dome-shaped), or combination thereof and the like, as long as the gas sensors, pressure sensors, safety shutdown system, logic devices, and the like have suitable fittings to connect (either via wired or wireless communication) the to a power source. In yet other embodiments, the habitat may be rectangular, but this arrangement is not strictly necessary in all embodiments. For example, one or more corners of a generally rectangular habitat could be rounded, concave or convex, depending on the desired pressure inside the habitat. It will be understood that such embodiments are part of this disclosure and deemed with in the claims. Furthermore, one or more of the various components may be ornamented with various ornamentation produced in various ways (for example stamping or engraving, or raised features such as reflectors, reflective tape, patterns of threaded round-head screws or bolts screwed into holes in the habitat), such as LNG facility designs, crude oil refinery or petrochemical designs, logos, letters, words, nicknames (for example TUFFss, and the like). The habitat may include optional hand-holds, which may be machined or formed to have easy-to-grasp features for fingers, or may have rubber grips shaped and adorned with ornamental features, such as raised knobby gripper patterns.

Thus the systems and methods described herein provide safety when performing hot work on in service equipment, especially in LNG storage and transfer facilities, crude oil refineries, and petrochemical plants, and with significantly reduced risk of injury and discomfort to workers.

Embodiments disclosed herein in

A: A method of maintaining an atmosphere inside a habitat enclosing a work station and shutting down one, more than one, or all operational equipment inside and/or outside the habitat (for example as dictated by the client, law, or regulation), in certain embodiments at least operational equipment inside and/or outside the habitat, upon the occurrence of an adverse event, the method comprising:

(a) sensing concentration of one or more explosive, flammable, and/or poisonous gases or vapors inside (alternatively, in certain embodiments outside, or in certain embodiments both inside and outside) the habitat;

(b) sensing pressure, temperature, and/or humidity inside (alternatively, in certain embodiments outside, or in certain embodiments both inside and outside) the habitat;

(c) transmitting (for example, by wired or wireless communication) the sensed concentrations, pressure, temperature, and/or humidity to a logic device (digital, analog or combination thereof, in certain embodiments a programmable logic controller (PLC));

(d) maintaining the pressure, temperature, and/or humidity inside the habitat (in certain embodiments within ranges defined by minimum and/or maximum set point pressures, temperatures, and humidities) by controlling one or more HVAC units and one or more air extraction units (AEUs) fluidly connected to the habitat and controlled by the logic device, the one or more AEUs extracting more air from the habitat than the one or more HVAC units supply to the habitat;

(e) optionally extracting dust from the habitat employing the one or more AEUs having one or more dust collection units fluidly connected to the one or more AEUs and controlled by the logic device;

(f) extracting the explosive, flammable, and/or poisonous gases or vapors from inside the habitat employing an emergency gas extraction sub-system (EGES) (in certain embodiments comprising one or more Venturi eductors or jets, and one or more gas compressors (in certain embodiments, air compressors)) having an intake fluidly connected to the habitat, the EGES (and/or actuators associated therewith) controlled by the logic device, upon concentration of one or more of the explosive, flammable, and/or poisonous gases or vapors exceeding one or more maximum set point concentrations; and (g) transmitting one or more signals from the logic device shutting down one, more than one, or all operational equipment inside and/or outside the habitat (for example as dictated by the client, law, or regulation), in certain embodiments all operational equipment inside and/or outside the habitat, upon the logic device receiving one or more adverse event signals selected from the group consisting of
  i) a pressure rise in the sensed pressure above the maximum set point pressure inside the habitat, the maximum set point pressure being less than atmospheric pressure;
  ii) a rise in concentration of one or more of the one or more sensed concentrations above the one or more maximum set point concentrations; and
  iii) combination of i) and ii).

B. A method of maintaining an atmosphere inside a habitat enclosing a work station performing maintenance in a live environment, and shutting down one, more than one, or all operational equipment inside and/or outside the habitat (for example as dictated by the client, law, or regulation), in certain embodiments all operational equipment inside and outside the habitat, upon the occurrence of an adverse event, the method comprising:

(a) sensing concentration of one or more explosive, flammable, and/or poisonous gases or vapors inside (alternatively, in certain embodiments outside, or in certain embodiments both inside and outside) the habitat;

(b) sensing pressure, temperature, and/or humidity inside (alternatively, in certain embodiments outside, or in certain embodiments both inside and outside) the habitat;

(c) transmitting the sensed concentrations, pressure, temperature, and/or humidity to a logic device (digital, analog or combination thereof, in certain embodiments a programmable logic controller (PLC));

(d) maintaining the pressure, temperature, humidity in the habitat (in certain embodiments within ranges defined by minimum and/or maximum set point pressures, temperatures, and humidities) by controlling one or more HVAC units and one or more air extraction units (AEUs) fluidly connected to the habitat and controlled by the logic device, the one or more AEUs extracting more air from the habitat than the one or more HVAC units supply to the habitat;

(e) extracting blasting grit and dusts from the habitat employing one or more dust collection units (DCUs) fluidly connected to the one or more AEUs and controlled by the logic device;

(f) extracting the explosive, flammable, or poisonous gases or vapors from the habitat employing an emergency gas extraction sub-system (EGES) (in certain embodiments comprising one or more Venturi eductors or jets, and one or more gas compressors, in certain embodiments air compressors)) having an intake fluidly connected to the habitat, the EGES (and/or actuators associated therewith) controlled by the logic device, upon concentration of one or more of the explosive, flammable, and/or poisonous gases or vapors exceeding one or more maximum set point concentrations; and (g) transmitting one or more signals from the logic device shutting down one, more than one, or all operational equipment inside and/or outside the habitat (for example as dictated by the client, law, or regulation), in certain embodiments all operational equipment inside and outside the habitat, upon the logic device receiving one or more signals selected from the group consisting of:
  i) a pressure rise in the sensed pressure above the maximum set point pressure, the maximum set point pressure being less than atmospheric pressure;
  ii) a rise in concentration of one or more of the one or more sensed concentrations above the one or more maximum set point concentrations; and
  iii) combination of i) and ii).

C: A system configured to maintain an atmosphere inside a habitat enclosing a work station and shut down one, more than one, or all operational equipment inside and/or outside the habitat (for example as dictated by the client, law, or regulation), in certain embodiments at least operational equipment inside and/or outside the habitat, upon the occurrence of an adverse event, the system comprising:

(a) one or more explosive, flammable, and/or poisonous gas or vapor sensors for sensing concentration of one or more explosive, flammable, and/or poisonous gases or vapors inside (alternatively, in certain embodiments outside, or in certain embodiments both inside and outside) the habitat;

(b) one or more pressure sensors, one or more temperature sensors, and/or one or more humidity sensors inside (alternatively, in certain embodiments outside, or in certain embodiments both inside and outside) the habitat;

(c) one or more logic devices (digital, analog or combinations thereof, in certain embodiments a programmable logic controller (PLC)) in communication with the one or more explosive, flammable, and/or poisonous gas or vapor sensors, the one or more temperature sensors, the one or more pressure sensors, and/or the one or more humidity sensors;

(d); one or more HVAC units fluidly connected to the habitat and in communication with the one or more logic devices;

(e) one or more air extraction units (AEUs) fluidly connected to the habitat and in communication with the one or more logic devices;

(f) optionally the one or more AEUs having one or more dust collection units (DCUs) fluidly connected to the one or more AEUs and in communication with the one or more logic devices;

(g) an emergency gas extraction sub-system (EGES) (in certain embodiments comprising one or more Venturi eductors or jets, and one or more gas compressors (in certain embodiments air compressors)) having an intake fluidly connected to the habitat, the EGES (and/or actuators associated therewith) in communication with the one or more logic devices;

(h) the one or more logic devices configured to:
i) maintain the pressure, temperature, and/or humidity in the habitat (in certain embodiments within ranges defined by minimum and maximum set point pressures, temperatures, and humidities) by controlling the one or more HVAC units and the one or more AEUs, the one or more AEUs configured to extract more air from the habitat than the one or more HVAC units supply to the habitat;
ii) optionally remove dust to an acceptable level (at least 90 percent, or at least 91, 92, 93 94 95, 96, 97, 98, 99, or 99.5 percent) from the habitat by operating the optional DCUs;
iii) transmit one or more signals to shut down one, more than one, or all operational equipment inside and/or outside the habitat (for example as dictated by the client, law, or regulation), in certain embodiments all operational equipment inside and/or outside the habitat upon receiving one or more signals selected from the group consisting of:
a) a pressure rise in the sensed pressure above the maximum set point pressure, the maximum set point pressure being less than atmospheric pressure;
b) a rise in concentration of one or more of the one or more sensed concentrations of explosive, flammable, or poisonous gases or vapors above one or more maximum set point concentrations; and
c) combination of a) and b); and
iv) transmit one or more signals to initiate operation of the EGES (and/or actuators associated therewith) upon receiving one or more signals indicating concentration of one or more of the explosive, flammable, and/or poisonous gases or vapors exceeds one or more maximum set point concentrations inside the habitat.

Each of the embodiments A, B, and C may have one or more of the following additional elements in any combination:

Element 1. Methods comprising shutting down all operation equipment outside the habitat upon the occurrence of the adverse event.

Element 2. Methods configured to operate in modes selected from the group consisting of automatic continuous mode, automatic periodic mode, and manual mode.

Element 3. Methods wherein the one or more operational equipment are selected from the group consisting of pneumatic, electric, fuel, hydraulic, and combinations thereof.

Element 4. Methods wherein the one or more explosive, flammable, and/or poisonous gases and vapors are selected from organic gases and vapors, combinations thereof (for example, an adduct), and mixtures thereof.

Element 5. Methods of wherein the one or more explosive and/or flammable dusts are inorganic dusts.

Element 6. Methods wherein the one or more inorganic explosive and/or flammable dusts are one or more thermal spray metal dusts.

Element 7. Methods wherein the one or more thermal spray metal dusts are selected from the group consisting of thermal spray aluminum dust, thermal spray zinc dust, thermal spray copper dust, thermal spray stainless steel dust, thermal spray metal alloy dust, and combinations and mixtures thereof.

Element 8. Methods wherein the sensing concentration of the one or more explosive, flammable, and/or poisonous gases or vapors inside of the habitat comprises sensing concentration of explosive, flammable, or poisonous gases and vapors selected from the group consisting of natural gas, methane, ethane, ethylene oxide, hydrogen sulfide, oxygen, nitrogen, argon, hydrogen, carbon dioxide, carbon monoxide, propane, butane, pentane, and combinations and mixtures thereof.

Element 9. Methods comprising sensing concentration of the one or more explosive, flammable, and/or poisonous gases or vapors outside the habitat.

Element 10. Methods comprising sensing concentration of the one or more explosive, flammable, and/or poisonous gases or vapors at an air intake to the habitat.

Element 11. Methods wherein the sensing of concentration of the one or more explosive, flammable, and/or poisonous gases or vapors inside the habitat occurs at designated locations inside the habitat.

Element 12. Methods comprising operating the logic device from a human/machine interface wired or wirelessly connected to the logic device.

Element 13. Methods comprising the logic device initiating one or more audio/visual warnings upon the occurrence of the pressure rise in the sensed pressure above the set point pressure, or the rise in concentration of one or more of the one or more sensed concentrations above one or more set point concentrations.

Element 14. Methods comprising opening one or more one-way back flash valves in ducts fluidly connecting the EGES with the habitat.

Element 15. Systems configured to shut down operational equipment inside and/or outside the habitat upon the occurrence of the adverse event.

Element 16. Systems configured to operate in modes selected from the group consisting of automatic continuous mode, automatic periodic mode, and manual mode.

Element 17. Systems configured to shutdown one, more than one, or all operational equipment selected from the group consisting of pneumatic, electric, fuel, hydraulic, and combinations thereof.

Element 18. Systems configured to shutdown one, more than one, or all operational equipment selected from the group consisting of pneumatic, electric, fuel, hydraulic, and combinations thereof upon detection of one or more explosive, flammable, and/or poisonous gases selected from organic gases and vapors, combinations thereof (for example, an adduct), and mixtures thereof.

Element 19. Systems configured to remove one or more explosive inorganic dusts from the habitat.

Element 20. Systems configured to remove one or more thermal spray metal dusts.

Element 21. Systems configured to remove one or more thermal spray metal dusts selected from the group consisting of thermal spray aluminum dust, thermal spray zinc dust, thermal spray copper dust, thermal spray stainless steel dust, thermal spray metal alloy dust, and combinations and mixtures thereof.

Element 22. Systems configured to sense and remove one or more explosive, flammable, and/or poisonous gases or vapors inside of the habitat selected from the group consisting of natural gas, methane, ethane, ethylene oxide, hydrogen sulfide, oxygen, nitrogen, argon, hydrogen, carbon dioxide, carbon monoxide, propane, butane, pentane, and combinations and mixtures thereof.

Element 23. Systems configured to sense concentration of one or more explosive, flammable, and/or poisonous gases or vapors outside the habitat.

Element 24. Systems configured to sense concentration of one or more explosive, flammable, and/or poisonous gases or vapors at one or more air intakes to the habitat.

Element 25. Systems configured to sense concentration of one or more explosive, flammable, and/or poisonous gases or vapors inside the habitat at designated locations inside the habitat.

Element 26. Systems configured to operate and/or view the logic device from a human/machine interface wired or wirelessly connected to the logic device.

Element 27. Systems configured so that the logic device initiates one or more audio/visual warnings upon the occurrence of the pressure rise in the sensed pressure above the set point pressure, or the rise in concentration of one or more of the one or more sensed concentrations above one or more set point concentrations.

Element 28. Systems configured to open one or more one-way back flash valves in ducts fluidly connecting the EGES with the habitat.

Element 29. Systems comprising a display with an interactive graphical user interface.

Appendix: United States Federal Regulations Pertaining to Hydrogen Sulfide Exposure Hydrogen sulfide exposure is covered under the following OSHA standards:
Worker Exposure Limits (Enforceable)
General Industry: 29 CFR 1910.1000 TABLE Z-2, Toxic and hazardous sub stances
  Exposures must not exceed 20 parts per million (ppm) (ceiling) with the following exception: if no other measurable exposure occurs during the 8-hour work shift, exposures may exceed 20 ppm, but not more than 50 ppm (peak), for a single time period up to 10 minutes.
Construction: 29 CFR 1926.55 Appendix A, Gases, vapors, fumes, dusts, and mists
  Sets exposure limit of 10 ppm (15 mg/m$^3$) time-weighted average (TWA)
Shipyard: 29 CFR 1915.1000 Table Z, Air contaminants
  Sets exposure limit of 10 ppm (15 mg/m$^3$) TWA
29 CFR 1910.119 App A and 29 CFR 1926.64 App A, List of highly hazardous chemicals, toxics and reactives (mandatory). Hydrogen sulfide is included in these lists of toxic and reactive highly hazardous chemicals and is considered to present a potential for a catastrophic event at or above 1500 pounds.

Below are standards that include OSHA requirements for evaluating (e.g., process safety, toxic and hazardous substances) and controlling (ventilation, respiratory protection) hydrogen sulfide exposures, including in confined spaces. Industry-specific requirements (construction, shipyard, marine terminals and longshoring) follow.

General Industry
(29 CFR 1910)
1910 Subpart G, Occupational health and environmental control
1910.94, Ventilation
1910 Subpart H, Hazardous materials
1910.119, Process safety management of highly hazardous chemicals.
1910 Subpart I, Personal protective equipment
1910.134, Respiratory protection
Appendix B to Subpart I to Part 1910, Non-mandatory compliance guidelines for hazard assessment and personal protective equipment selection
1910 Subpart J, General environmental controls
1910.146, Permit-required confined spaces
1910.146 App C, Examples of permit-required confined space programs
1910.146 App D, Sample permits
1910.146 App E, Sewer system entry
1910 Subpart Z, Toxic and hazardous substances
1910.1000, Air contaminants
1910.1200, Hazard communication
Appendix A, Health hazard criteria (mandatory)
1910.1450, Occupational exposure to hazardous chemicals in laboratories
Appendix A, National Research Council recommendations concerning chemical hygiene in laboratories (non-mandatory)
Construction
(29 CFR 1926)
1926 Subpart D, Occupational health and environmental control
1926.55, Gases, vapors, fumes, dusts, and mists
Appendix A, 1970 American Conference of Governmental Industrial Hygienists' Threshold Limit Values of Airborne Contaminants
1926 Subpart S, Underground construction, caissons, cofferdams, and compressed air
1926.800, Underground construction
Shipyard Employment
(29 CFR 1915)
1915 Subpart B—Confined and enclosed spaces and other dangerous atmospheres in shipyard employment
1915.12, Precautions and the order of testing before entering confined and enclosed spaces and other dangerous atmospheres
1915 Subpart Z, Toxic and hazardous substances
1915.1000, Air contaminants
Marine Terminals
(29 CFR 1917)
1917.1, Marine terminals, scope and applicability
1917.73, Terminal facilities handling menhaden and similar species of fish
Safety and Health Regulations for Longshoring
(29 CFR 1918)
1918.1, Safety and health regulations for longshoring, scope and application
1918.94(f), Ventilation and atmospheric conditions. Employees shall not enter the hold when the hydrogen sulfide level exceeds 20 ppm ceiling or when the oxygen content is less than 19.5 percent, except in emergencies.
Letters of Interpretation (supplementary guidance that clarifies the application of an established Agency policy or procedure)

The appropriate method for assessing hydrogen sulfide peak exposure levels. (Sep. 28, 1995).

Respiratory protection requirements for sour crude oil tank gauging operations. (Apr. 25, 1989).

Post-emergency response and medical surveillance requirements of HAZWOPER. (Aug. 5, 1993).

Respiratory protection as it relates to oil fields. (Apr. 14, 1993).

Interpretation of OSHA requirements for personal protective equipment to be used during marine oil spill emergency response operations. (Sep. 11, 1995).

Order of testing for permit spaces. (Jul. 13, 1994).

Potentially hazardous amine absorber pressure vessels used in refinery processing. (Apr. 11, 1986).

Use of Bureau of Mines approved gas mask canisters. (Nov. 15, 1985).

HHCs as it applies to hydrochloric acid, hydrofluoric acid, hydrogen sulfide, hydrogen cyanide. (Jun. 9, 1994).

Interpretation of substances with high acute toxicity as used in the occupational exposures to hazardous chemicals in the laboratory standard. (Jul. 5, 1990).

Respirator rules as applied to open hatch gauging of sour crude oil storage tanks. (Jun. 11, 1990).

Interpretation of "high degree of acute toxicity" under the laboratory standard. (Jul. 30, 1990).

NIOSH approved respirator during the period of an employee's escape from a chemical release of phosgene. (Jul. 1, 1997).

Release of hazardous chemicals from gas calibration bottles. (Jan. 3, 1994).

OSHA's policy on classification of a wet well as a Class 1, Division 1 location. (Nov. 5, 1979).

Fires involving spills or releases of hazardous substances. (Jun. 17, 1991).

Compliance and enforcement activities affected by the PELs decision. (Aug. 5, 1993).

The appropriate atmospheric monitoring equipment to the wine making industry for compliance with OSHA standard 1910.146. (Jun. 21, 1995).

From the foregoing detailed description of specific embodiments, it should be apparent that patentable systems, combinations, and methods have been described. Although specific embodiments of the disclosure have been described herein in some detail, this has been done solely for the purposes of describing various features and aspects of the systems and methods, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to take an existing habitat structure and modify it to include a safety shutdown system of this disclosure thereon. Another modification would be for habitat suppliers to supply systems with built-in safety shutdown systems in accordance with the present disclosure, including gas sensors and pressure sensors. In other embodiments, the safety shutdown system may be skid or truck-mounted.

What is claimed is:

1. A method of maintaining an atmosphere inside a habitat enclosing a work station and shutting down one, more than one, or all operational equipment inside and/or outside the habitat upon the occurrence of an adverse event, the method comprising:

(a) sensing concentration of one or more explosive, flammable, and/or poisonous gases or vapors inside and/or outside the habitat;

(b) sensing pressure, temperature, and/or humidity inside and/or outside the habitat;

(c) transmitting, by wired or wireless communication the sensed concentrations, pressure, temperature, and/or humidity to a logic device;

(d) maintaining the pressure, temperature, and/or humidity inside the habitat by controlling one or more HVAC units and one or more air extraction units (AEUs) fluidly connected to the habitat and controlled by the logic device, the one or more AEUs extracting more air from the habitat than the one or more HVAC units supply to the habitat;

(e) optionally extracting dust from the habitat employing the one or more AEUs having one or more dust collection units fluidly connected to the one or more AEUs and controlled by the logic device;

(f) extracting the explosive, flammable, and/or poisonous gases or vapors from inside the habitat employing an emergency gas extraction sub-system (EGES), an intake of the sub-system fluidly connected to the habitat, the EGES controlled by the logic device, upon concentration of one or more of the explosive, flammable, and/or poisonous gases or vapors exceeding one or more maximum set point concentrations; and (g) transmitting one or more signals from the logic device shutting down one, more than one, or all operational equipment inside and/or outside the habitat upon the logic device receiving an adverse event signal indicating a pressure rise in the sensed pressure above a maximum set point pressure inside the habitat, the maximum set point pressure being less than atmospheric pressure.

2. The method of claim 1 comprising shutting down operational equipment outside the habitat upon the occurrence of the adverse event.

3. The method of claim 1 configured to operate in modes selected from the group consisting of automatic continuous mode, automatic periodic mode, and manual mode.

4. The method of claim 1 wherein the one or more operational equipment are selected from the group consisting of pneumatic, electric, fuel, hydraulic, and combinations thereof.

5. The method of claim 1 wherein the one or more explosive, flammable, and/or poisonous gases and vapors are selected from organic gases and vapors, combinations thereof, and mixtures thereof.

6. The method of claim 1 wherein the one or more explosive dusts are inorganic dusts.

7. The method of claim 6 wherein the one or more inorganic explosive dusts are one or more thermal spray metal dusts.

8. The method of claim 7 wherein the one or more thermal spray metal dusts are selected from the group consisting of thermal spray aluminum dust, thermal spray zinc dust, thermal spray copper dust, thermal spray stainless steel dust, thermal spray metal alloy dust, and combinations and mixtures thereof.

9. The method of claim 1 wherein the sensing concentration of the one or more explosive, flammable, and/or poisonous gases or vapors inside of the habitat comprises sensing concentration of explosive, flammable, or poisonous gases and vapors selected from the group consisting of natural gas, methane, ethane, ethylene oxide, hydrogen sulfide, oxygen, nitrogen, argon, hydrogen, carbon dioxide, carbon monoxide, propane, butane, pentane, and combinations and mixtures thereof.

10. The method of claim 1 comprising sensing concentration of the one or more explosive, flammable, and/or poisonous gases or vapors outside the habitat.

11. The method of claim 10 comprising sensing concentration of the one or more explosive, flammable, and/or poisonous gases or vapors at an air intake to the habitat.

12. The method of claim 1 wherein the sensing of concentration of the one or more explosive, flammable, and/or poisonous gases or vapors inside the habitat occurs at designated locations inside the habitat.

13. The method of claim 1 comprising operating and/or viewing the logic device from a human/machine interface wired or wirelessly connected to the logic device.

14. The method of claim 1 comprising the logic device initiating one or more audio and/or visual warnings upon the occurrence of the pressure rise in the sensed pressure above the set point pressure, or the rise in concentration of one or more of the one or more sensed concentrations above one or more set point concentrations.

15. The method of claim 1 comprising opening one or more one-way back flash valves in ducts fluidly connecting the EGES with the habitat.

16. A method of maintaining an atmosphere inside a habitat enclosing a work station performing maintenance in a live environment, and shutting down one, more than one, or all operational equipment inside and/or outside the habitat upon the occurrence of an adverse event, the method comprising:
 (a) sensing concentration of one or more explosive, flammable, and/or poisonous gases or vapors inside and/or outside the habitat;
 (b) sensing pressure, temperature, and/or humidity inside and/or outside the habitat;
 (c) transmitting the sensed concentrations, pressure, temperature, and/or humidity to a logic device;
 (d) maintaining the pressure, temperature, and/or humidity in the habitat by controlling one or more HVAC units and one or more air extraction units (AEUs) fluidly connected to the habitat and controlled by the logic device, the one or more AEUs extracting more air from the habitat than the one or more HVAC units supply to the habitat;
 (e) optionally extracting blasting grit and dusts from the habitat employing one or more dust collection units (DCUs) fluidly connected to the one or more AEUs and controlled by the logic device;
 (f) extracting the explosive, flammable, or poisonous gases or vapors from the habitat employing an emergency gas extraction sub-system (EGES), an intake of the EGES fluidly connected to the habitat, the EGES controlled by the logic device, upon concentration of one or more of the explosive, flammable, and/or poisonous gases or vapors exceeding one or more maximum set point concentrations; and
 (g) transmitting one or more signals from the logic device shutting down one, more than one, or all operational equipment inside and/or outside the habitat upon the logic device receiving a signal
  indicating a pressure rise in the sensed pressure above a maximum set point pressure, the maximum set point pressure being less than atmospheric pressure.

17. The method of claim 16 wherein the one or more operational equipment are selected from the group consisting of pneumatic, electric, fuel, hydraulic, and combinations thereof.

18. The method of claim 16 comprising the logic device initiating one or more audio and/or visual warnings upon the occurrence of the pressure rise in the sensed pressure above the set point pressure, or the rise in concentration of one or more of the one or more sensed concentrations above one or more set point concentrations.

19. The method of claim 16 comprising opening one or more one-way back flash valves in ducts fluidly connecting the EGES with the habitat.

20. A system configured to maintain an atmosphere inside a habitat enclosing a work station and shut down one, more than one, or all operational equipment inside and/or outside the habitat upon the occurrence of an adverse event, the system comprising:
 (a) one or more explosive, flammable, and/or poisonous gas or vapor sensors for sensing concentration of one or more explosive, flammable, and/or poisonous gases or vapors inside and/or outside the habitat;
 (b) one or more pressure sensors, one or more temperature sensors, and/or one or more humidity sensors inside and/or outside the habitat;
 (c) one or more logic devices in communication with the one or more explosive, flammable, and/or poisonous gas or vapor sensors, the one or more temperature sensors, the one or more pressure sensors, and/or the one or more humidity sensors;
 (d); one or more HVAC units fluidly connected to the habitat and in communication with the one or more logic devices;
 (e) one or more air extraction units (AEUs) fluidly connected to the habitat and in communication with the one or more logic devices;
 (f) optionally the one or more AEUs having one or more dust collection units (DCUs) fluidly connected to the one or more AEUs and in communication with the one or more logic devices;
 (g) an emergency gas extraction sub-system (EGES) having an intake fluidly connected to the habitat, the EGES in communication with the one or more logic devices;
 (h) the one or more logic devices configured to:
  i) maintain the pressure, temperature, and/or humidity in the habitat by controlling the one or more HVAC units and the one or more AEUs, the one or more AEUs configured to extract more air from the habitat than the one or more HVAC units supply to the habitat;
  ii) optionally remove dust to an acceptable level from the habitat by operating the optional DCUs;
  iii) transmit one or more signals to shut down one, more than one, or all operational equipment inside and/or outside the habitat upon receiving a signal
   indicating a pressure rise in the sensed pressure above a maximum set point pressure, the maximum set point pressure being less than atmospheric pressure;
   and
  iv) transmit one or more signals to initiate operation of the EGES upon receiving one or more signals indicating concentration of one or more of the explosive, flammable, and/or poisonous gases or vapors exceeds one or more maximum set point concentrations inside the habitat.

\* \* \* \* \*